(12) United States Patent
Lasser et al.

(10) Patent No.: US 10,089,604 B2
(45) Date of Patent: Oct. 2, 2018

(54) METHOD AND APPARATUS FOR MANAGING A JOINT SLIDE SHOW WITH ONE OR MORE REMOTE USER TERMINALS

(71) Applicant: COMIGO LTD., Yarkona (IL)

(72) Inventors: Menahem Lasser, Kohav-Yair (IL); Itzhak Pomerantz, Kfar Saba (IL)

(73) Assignee: COMIGO LTD., Yarkona (IL)

( * ) Notice: Subject to any disclaimer, the term of this patent is extended or adjusted under 35 U.S.C. 154(b) by 621 days.

(21) Appl. No.: 14/873,320

(22) Filed: Oct. 2, 2015

(65) Prior Publication Data
US 2016/0132221 A1    May 12, 2016

Related U.S. Application Data

(60) Provisional application No. 62/075,970, filed on Nov. 6, 2014.

(51) Int. Cl.
*G06F 3/00* (2006.01)
*G06Q 10/10* (2012.01)
(Continued)

(52) U.S. Cl.
CPC ....... *G06Q 10/101* (2013.01); *H04N 1/00198* (2013.01); *H04N 7/15* (2013.01); *H04N 21/4788* (2013.01)

(58) Field of Classification Search
CPC ... G06F 3/0482; G06F 3/0485; H04L 65/403; H04L 51/32; H04L 29/06176; H04N 7/15
See application file for complete search history.

(56) References Cited

U.S. PATENT DOCUMENTS 8,195,768 B2 *  6/2012  Vaughan ............... G06F 3/0482
                                                              709/219
9,052,867 B2 *  6/2015  Bansal .................. G06F 3/1454
(Continued)

FOREIGN PATENT DOCUMENTS

| CN | 103491125 A | 1/2014 |
| JP | 2008003427 A | 1/2008 |
| JP | 2010086194 A | 4/2010 |

OTHER PUBLICATIONS

Trueconf 4.3.2 marketing document downloaded from Internet on Jul. 6, 2015.
(Continued)

*Primary Examiner* — Haoshian Shih
(74) *Attorney, Agent, or Firm* — Marc Van Dyke; Fourth Dimension IP

(57) ABSTRACT

Methods and apparatus for managing a joint slide show by a source user terminal in communication with one or more remote user terminal(s) are disclosed herein. During the slide show, a plurality of picture files are shown on the source user terminal. One or more slide-show display-transitions are performed at the source user terminal by replacing, at a slide-show display-location of the source user terminal, a pre-transition picture file with a post-transition picture file. In some embodiments, (i) for each slide-show display-transition, a respective post-transition picture file is sent from the source terminal to each remote user terminal in advance of the slide-show display-transition and/or (ii) each of the slide-show display-transitions is contingent upon, and performed only after meeting a condition related to a number of remote user-terminals from which the source terminal has received a confirmation message confirming receipt of the respective post-transition picture file.

20 Claims, 38 Drawing Sheets

(51) Int. Cl.
 *H04N 1/00* (2006.01)
 *H04N 7/15* (2006.01)
 *H04N 21/4788* (2011.01)

(56) References Cited

U.S. PATENT DOCUMENTS

| | | |
|---|---|---|
| 2005/0039133 A1 | 2/2005 | Wells et al. |
| 2007/0245248 A1* | 10/2007 | Christiansen ..... H04L 29/06027 715/753 |
| 2009/0249222 A1 | 10/2009 | Schmidt et al. |
| 2009/0254839 A1* | 10/2009 | Kripalani .............. G06F 3/0231 715/753 |
| 2012/0198334 A1 | 8/2012 | Surin et al. |
| 2013/0173742 A1 | 7/2013 | Thomas et al. |
| 2013/0311947 A1 | 11/2013 | Tsai et al. |
| 2014/0072945 A1 | 3/2014 | Gu et al. |

OTHER PUBLICATIONS

Machine translation of JP2008003427—translation generated on Jul. 13, 2015.
Machine translation of CN103491125—translation generated on Jul. 13, 2015.
Machine translation of JP2010086194—translation generated on Jul. 13, 2015.

\* cited by examiner

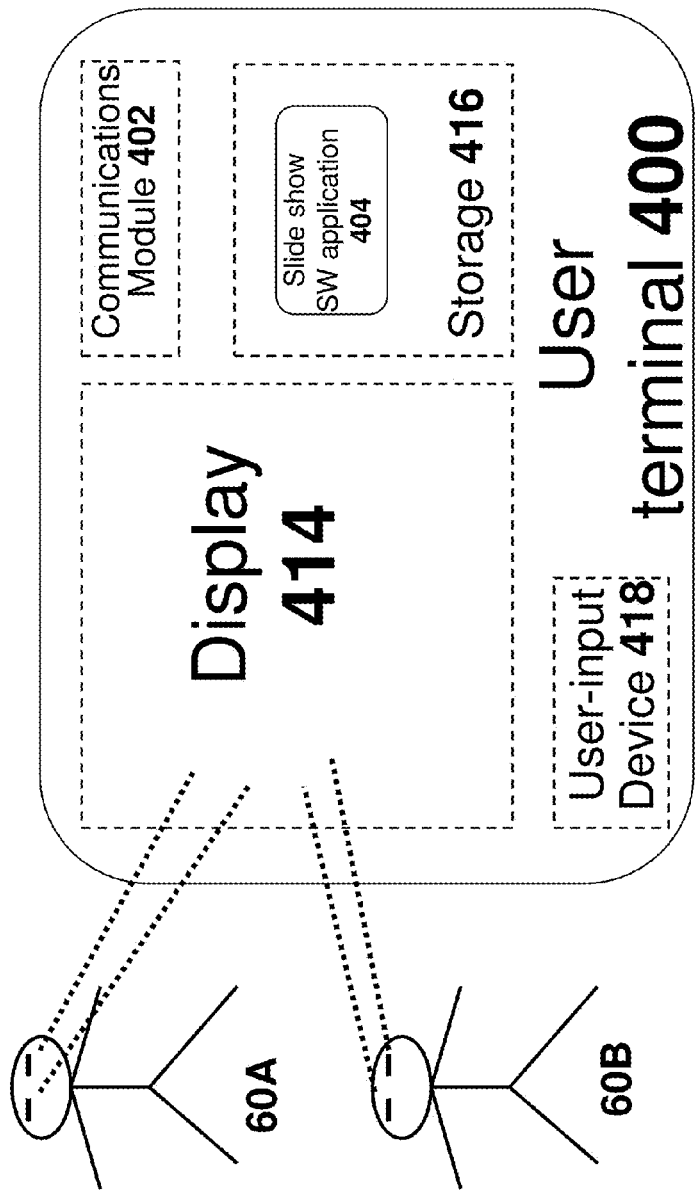
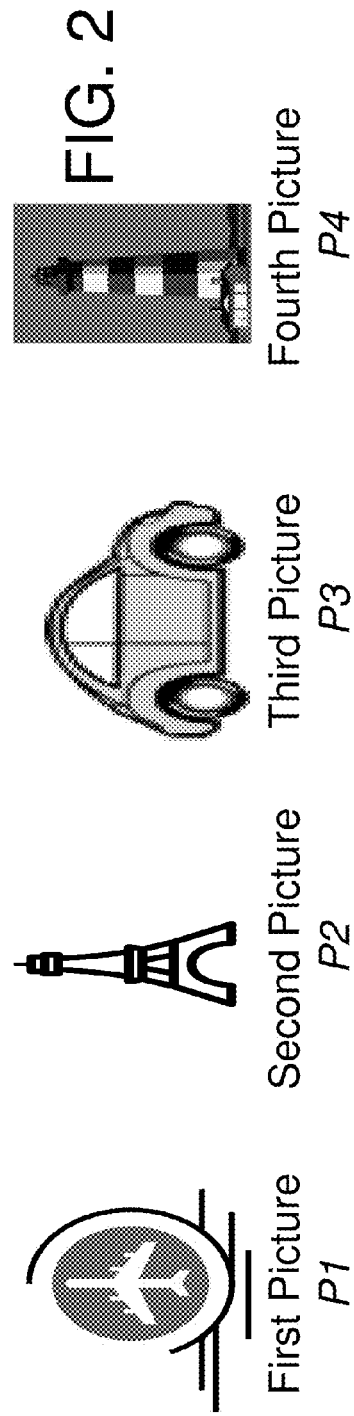

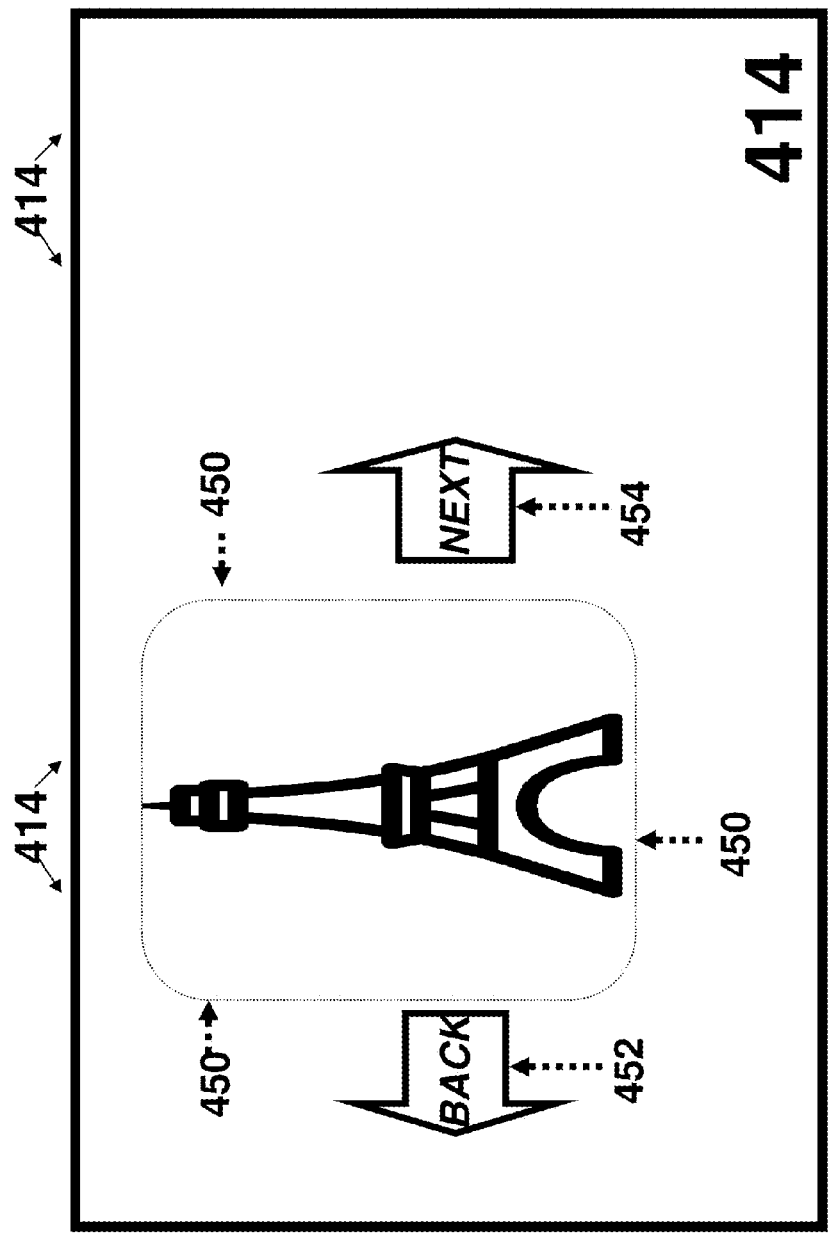

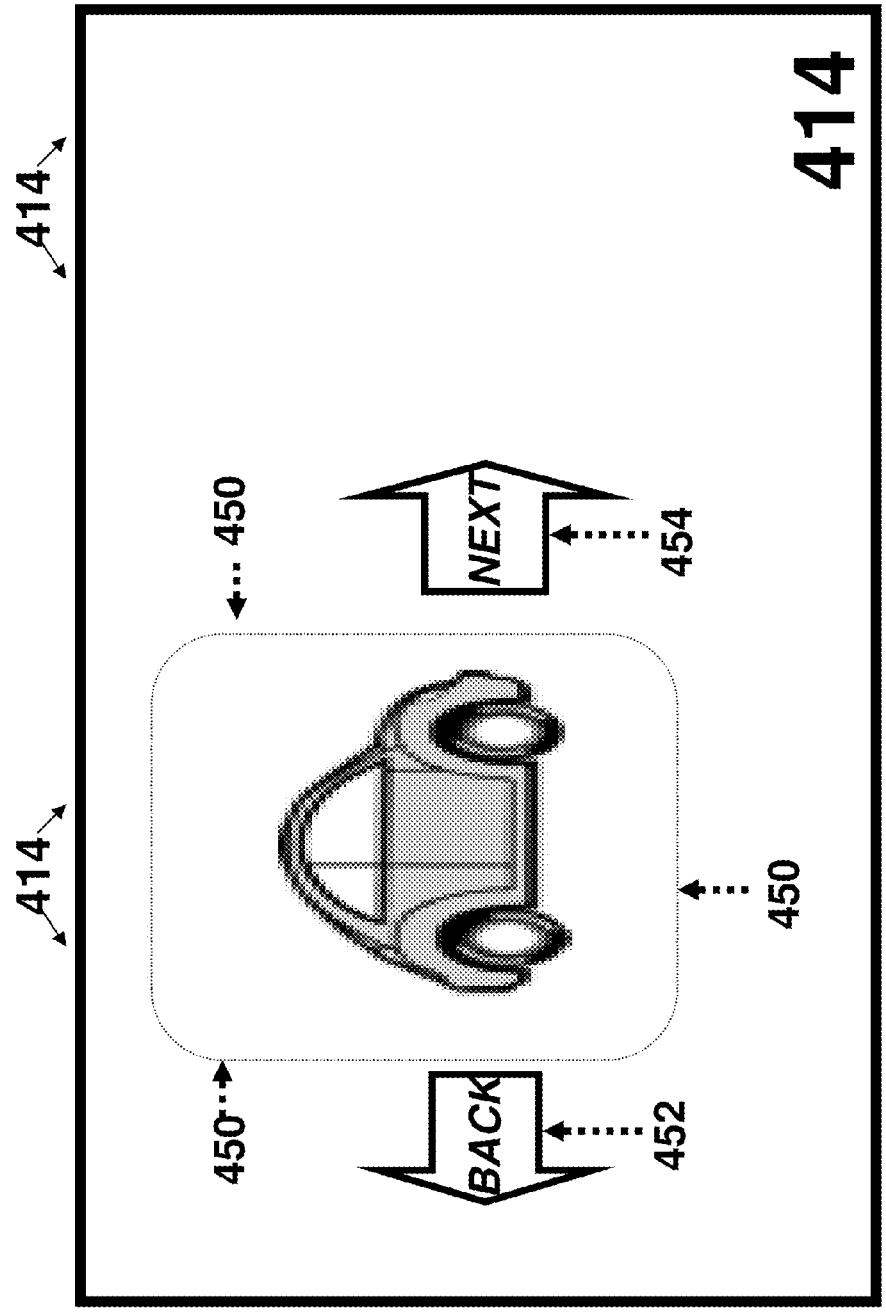

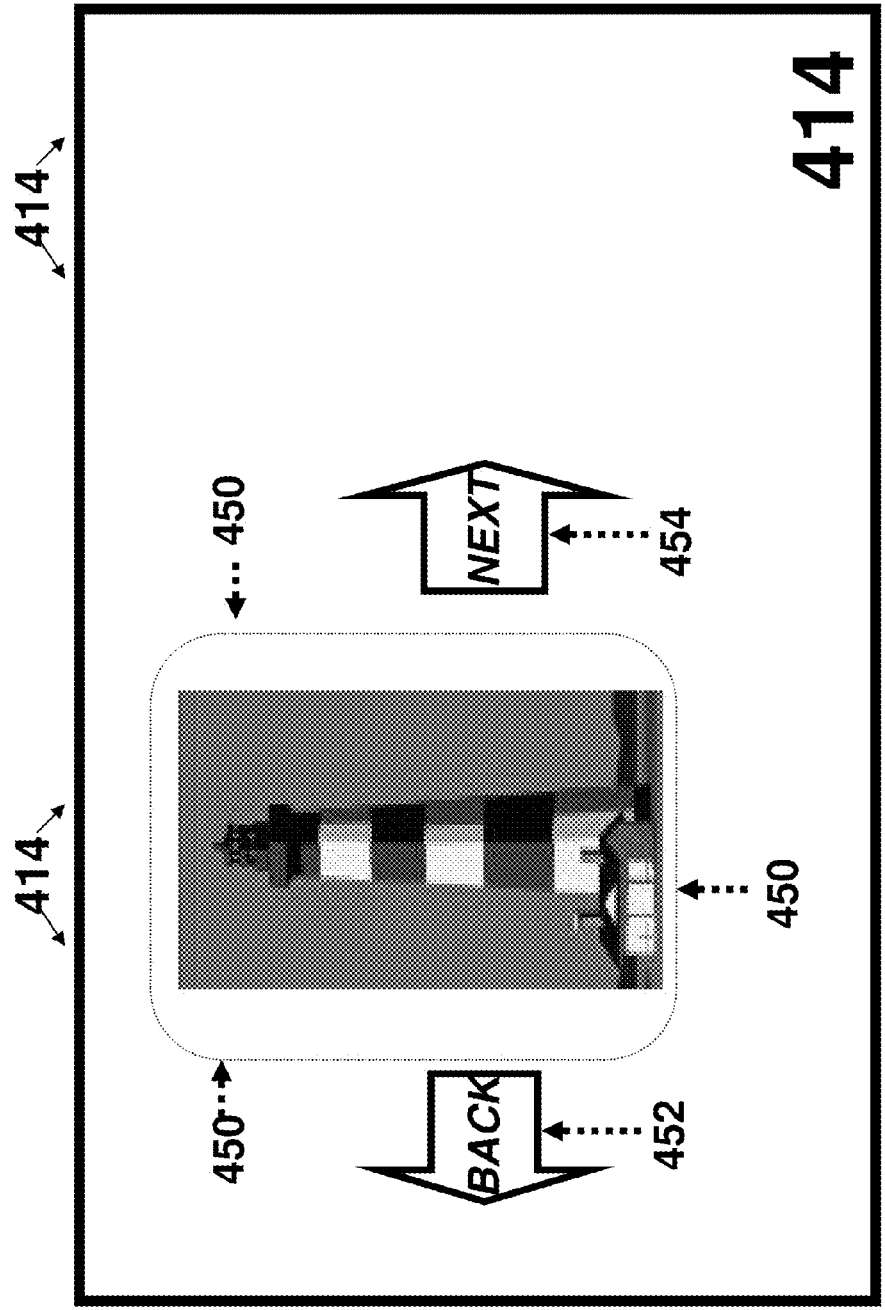

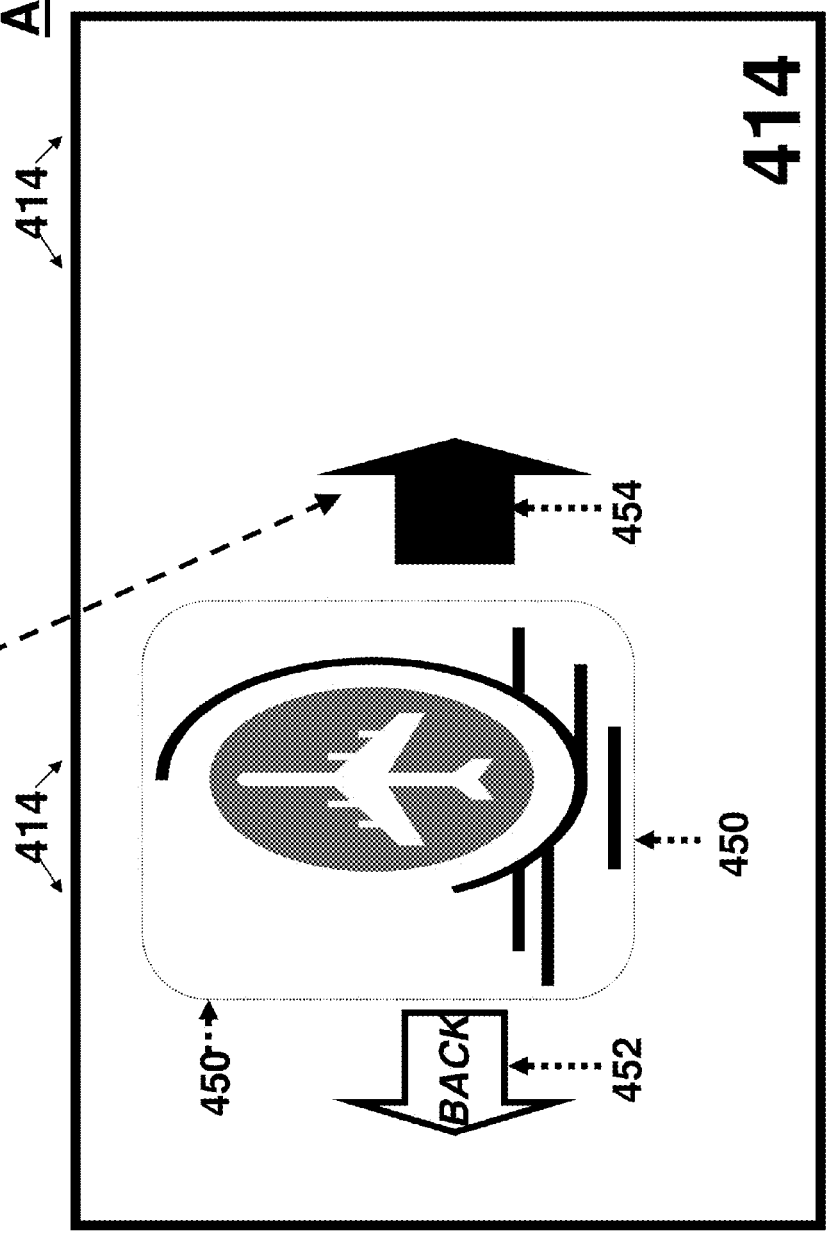

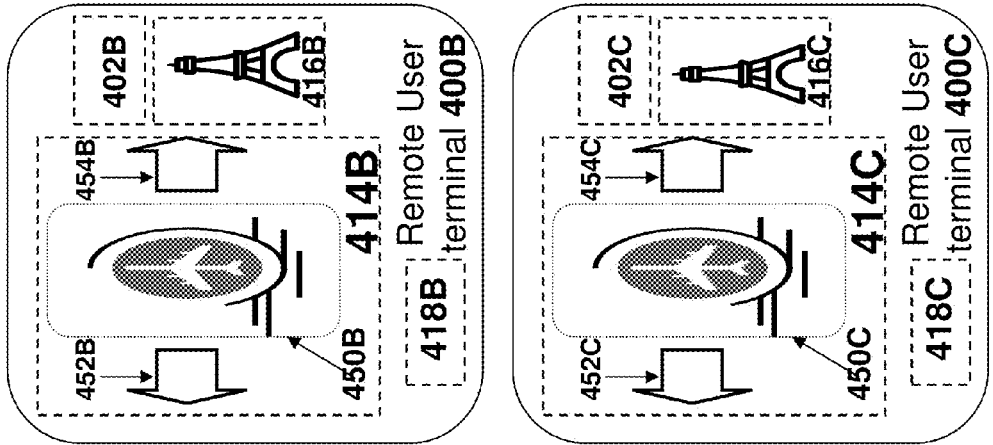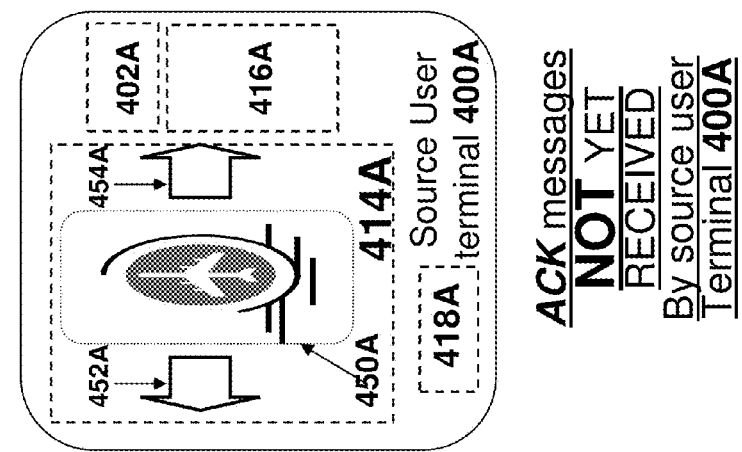
FIG. 11C

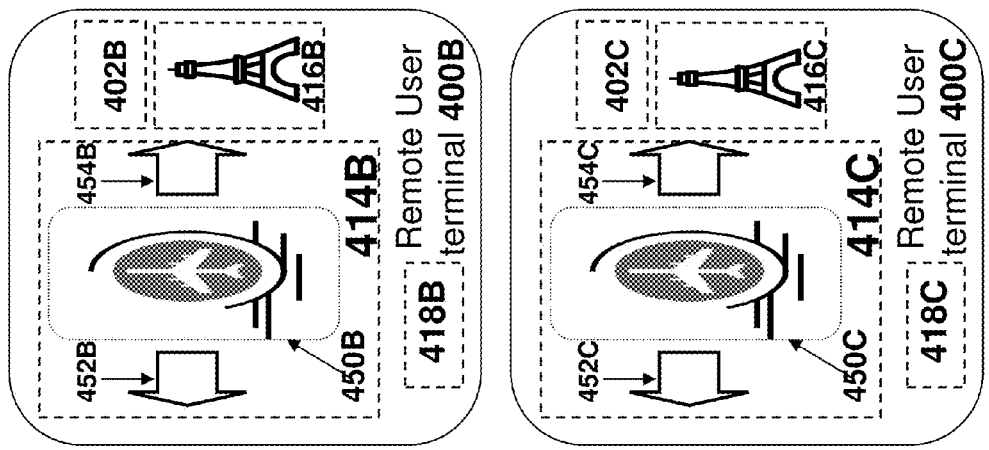
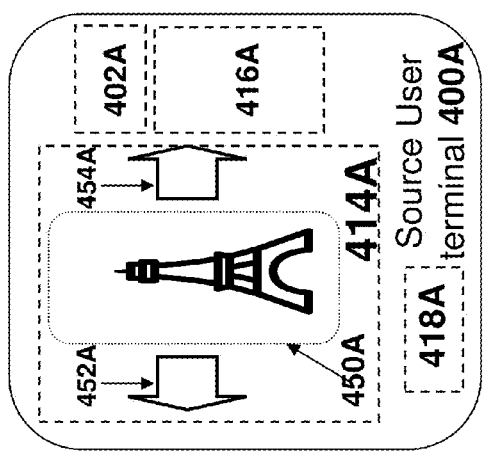
SCENARIO A
Time = $t_5$
FIG. 11F
SUCCESSFUL Display-transition At Source Terminal

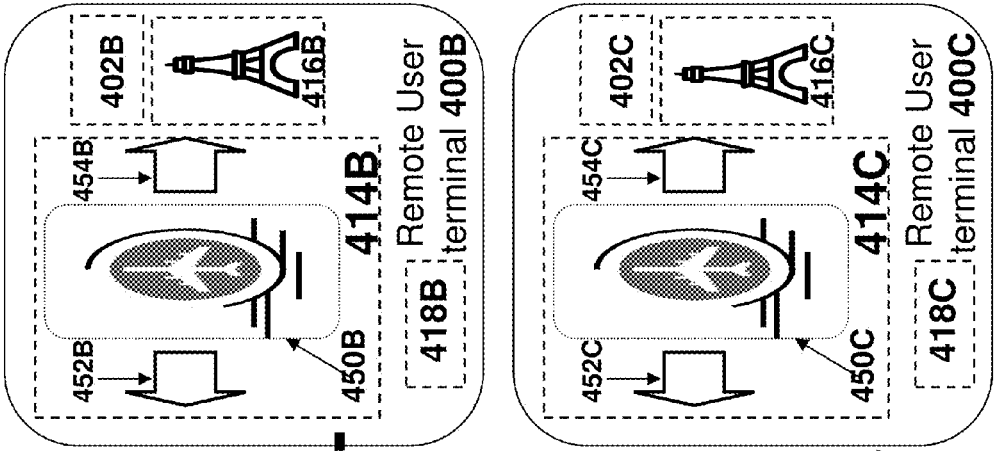
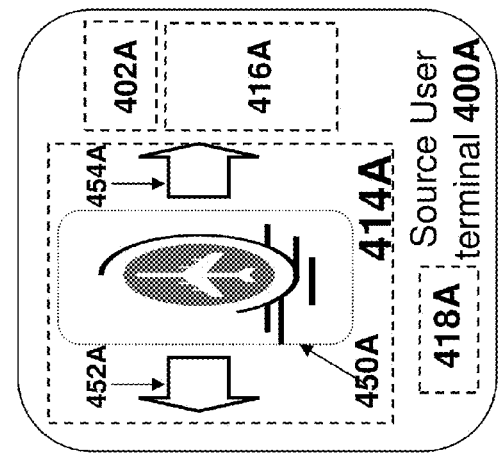
FIG. 13E

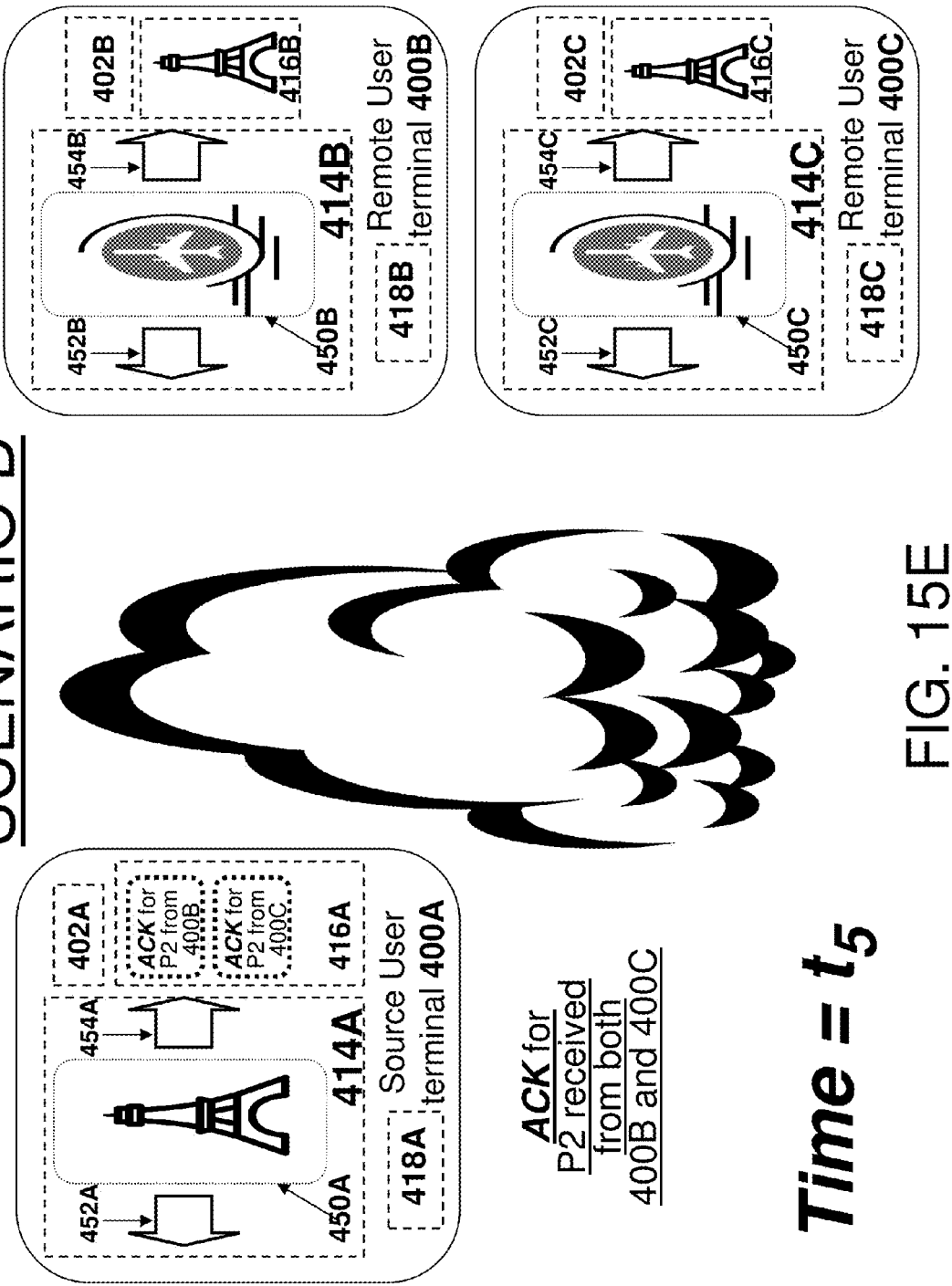

METHOD AND APPARATUS FOR MANAGING A JOINT SLIDE SHOW WITH ONE OR MORE REMOTE USER TERMINALS

CROSS-REFERENCE TO RELATED APPLICATIONS

This patent application claims the benefit of U.S. Provisional Patent Application No. 62/075,970 filed on Nov. 6, 2014, which is incorporated herein by reference in its entirety.

BACKGROUND AND RELATED ART

The present invention relates to distributed graphical user interfaces (GUI) for a joint slide show, e.g. a remote-slide-show GUI distributed over multiple user terminals in communication with each other over a network.

Localized Computerized Slide-Shows

Local computerized slide-shows are known in the art—FIG. 1 illustrates an exemplary system. The system includes a user terminal 400 (e.g. laptop, mobile telephone, tablet, desktop, etc) where one or more microprocessor(s) (NOT SHOWN) execute a slide-show software application 404 stored in local storage 416. The slide show is presented on a display device 414 that is part of or in local communication with user terminal 400. Also illustrated in FIG. 1 is user-input device 418—for example, a mouse or touch-screen or keyboard. In another example, the user-input device 418 may include gesture-sensing apparatus to sense user gestures—e.g. a camera and image processing module(s).

As shown in FIG. 1, any number of users 60A, 60B may simultaneously view the display screen for joint viewing of the same slide show.

A discussion of computerized slide-shows is now presented—these features relate to prior-art localized computerized slide-show as well as to remote slide shows as described and claimed below.

The example will be explained with reference to a non-limiting 'use case' of a slide show having four pictures P1-P4 displayed in sequence (e.g. ordered sequence or 'random sequence' in 'shuffle mode'). These four pictures P1-P4 are displayed in FIG. 2.

FIGS. 3A-3D describe presentation of the local slide show on display 414. FIGS. 3A-3D correspond to first, second, third and fourth frames at respective times $t_1$, $t_2$, $t_3$ and $t_4$.

In FIG. 3A, picture P1 is displayed at display-location 450 of display 414. At a later time, a 'slide-show display-transition' occurs so that picture P2 replaces picture P1 at display-location 450. Time $t_1$ of FIG. 3A corresponds to the time immediately before the slide-show display-transition and $t_2$ corresponds to the time immediately after the slide-show display-transition. For the slide-show display transition described by FIGS. 3A-3B, P1 is the pre-transition picture and P2 is the post-transition picture.

After this first slide-show display-transition, a second slide-show display-transition occurs after time $t_2$ and before time $t_3$, and a third slide-show display-transition occurs after time $t_3$ and before time $t_4$.

As noted above, FIGS. 3A-4D collectively describe three slide show display-transitions. Each slide-show display transition is characterized by respective pre-transition and post-transition pictures. FIG. 5 is a table summarizing the pre-transition and post-transition pictures for all three of the slide show display-transitions of FIGS. 3A-3D.

The slide-show display-transition may be triggered manually or automatically. In one example, user engagement of GUI control 452 or 454 triggers the slide-show display transition. Thus, in FIG. 4 the user engages GUI control 454 to 'advance' in the slide-show and trigger a slide-show display transition.

Alternatively or additionally, slide-show display transitions may be triggered automatically. For example, whenever an elapsed time since a most recent slide-show display transition exceeds a pre-determined threshold, user terminal 400 may automatically perform a subsequent slide-show display transition.

Every slide-show display transition is associated with respective pre-transition and post-transition pictures: (i) the pre-transition picture is displayed at display location 450 immediately before the slide-show display transition and (ii) upon carrying out the slide-show display transition, this pre-transition picture is replaced, at the display location, with the post-transition picture.

The example of FIGS. 3A-3D illustrate three slide-show display-transitions—the corresponding pre-transition and post-transition picture for each transition are shown in the table of FIG. 5.

It is noted that 'display location' (or the associated window) 450 is not required to be static—for example, in response to user input received via input device 418 the display location (e.g. center of the 'display window') may move, and the display window may be re-sized.

Remote Computerized Slide-Shows: The Problem

In contrast to the 'local viewing' system of FIG. 1, embodiments of the present invention relate to a remote system where first and second user-terminals are in remote communication with each other, for example, via a packet-switched network such as the Internet. In the local system of FIG. 1, co-viewing of a common slide show by first 60A and second 60B users is trivial—they can simply sit in front of a common screen and the first person can put all desired pictures in a common folder and then run a software tool that slide-shows those pictures.

In contrast, if the users are located in two different and possibly remote locations, this is much more difficult to achieve. One possible solution is that the person having the pictures will send all the picture files to the other person, either by emails or through a file sharing service like Google Drive. Then the other person will put the picture files in a common folder and will run a software tool to view them in a slide show. The problem with this solution is that in addition to being cumbersome it also does not provide a true sharing experience. The first person may want to add verbal comments and explanations while the second person is watching a specific picture. Even if the two persons coordinate a common session by having both of them start the slide show at the same time and having a phone call in parallel, it would still be difficult to achieve the same level of sharing experience as when in the same room. For example, if the first person needs more time for commenting on a specific picture and needs to freeze the slide show on that picture because of that, he cannot directly stop the slide show on his friend's screen.

Another possible solution is to use one of the many commercially available desktop sharing software tools. Using such tool the first person can play the slide show on his screen with the second person remotely viewing a copy of that screen. While this solution may solve the sharing experience issue it suffers from the disadvantage of exposing the first person's screen to the second person. The screen may contain other windows, not related to the shown pictures, which might contain private and confidential data. Sharing the desktop might therefore result in privacy violation. In addition, this solution also suffers from relatively long delays between the time of switching to a new picture at the first person's screen and the time the second person sees the new picture on his screen.

Exacerbating the situation is the fact that remote terminals are typically in communication with each other via packet-switched networks where the amount of time required for pictures sent from a source terminal to remote terminals is not known a-priori. Thus, for multi-slide slide-shows, the operator of the source terminal does not always know which remote terminals have received which pictures of the remote slide show.

There is an ongoing need for apparatus and methods for improved joint viewing of slide-shows by remote terminals in communication with each other via a computer network (e.g. a packet-switched network).

SUMMARY

A method of managing a joint slide-show by a source user terminal in communication with one or more remote user terminal(s), the slide-show for showing a plurality of picture files residing on the source user terminal, comprises: a. commencing the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and b. subsequently, locally performing one or more slide-show display-transitions at the source user terminal by replacing, at a slide-show display-location of the source user terminal, a pre-transition picture file with a post-transition picture file, wherein (i) for each slide-show display-transition, a respective post-transition picture file is sent from the source user terminal to each remote user terminal in advance of the slide-show display-transition; and (ii) each of the slide-show display-transitions is contingent upon, and performed only after meeting a condition related to a number of remote user-terminals from which the source user terminal has received a confirmation message confirming receipt of the respective post-transition picture file.

In some embodiments, the source user terminal is in communication with a plurality of remote user-terminals, and the condition requires receipt of confirmation messages from a majority of the remote user terminals.

In some embodiments, the source user terminal is in communication with a plurality of remote user-terminals, and the condition requires receipt of confirmation messages from every remote user terminal.

In some embodiments, the source user terminal is in communication with a plurality of remote user-terminals, and the condition requires receipt of confirmation messages from at least one of the remote user terminals.

In some embodiments, the source user terminal is in communication with only a single remote user terminal, and the condition requires receipt of a confirmation message from the single remote user-terminal.

In some embodiments, at least one of the slide-show display-transitions at the source user terminal is performed in response to user input at the source user terminal.

In some embodiments, the user input is provided by the user clicking upon a representation of the pre-transition picture file displayed on the source user terminal.

A method of managing a joint slide-show by a source user terminal in communication with one or more remote user terminal(s), the slide-show for showing a plurality of picture files residing on the source user terminal, comprises: a. commencing the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and b. subsequently, locally performing one or more slide-show display-transitions at the source user terminal by replacing, at a slide-show display-location of the source user terminal, a pre-transition picture file with a post-transition picture file, wherein (i) for each slide-show display-transition, a respective post-transition picture file is sent from the source user terminal to each remote user terminal in advance of the slide-show display-transition; and (ii) following each source-terminal slide-show display transition and in response thereto, a post-transition visual indication is provided by the source user terminal, indicating whether or not a condition has been met, the condition being related to a number of remote user-terminals from which the source user terminal has received a confirmation message confirming receipt of the respective post-transition picture file.

In some embodiments the source user terminal is in communication with a plurality of remote user-terminals, and the condition requires receipt of confirmation messages from a majority of the remote user terminals.

In some embodiments the source user terminal is in communication with a plurality of remote user-terminals, and the condition requires receipt of confirmation messages from every remote user terminal.

In some embodiments the source user terminal is in communication with a plurality of remote user-terminals, and the condition requires receipt of confirmation messages from at least one of the remote user terminals.

In some embodiments the source user terminal is in communication with only a single remote user terminal, and the condition requires receipt of a confirmation message from the single remote user-terminal.

In some embodiments, the post-transition visual indication is provided by a display mode of the post-transition picture file of the display transition.

In some embodiments, the post-transition visual indication is provided by a display mode of at least one slide-show user interface control.

In some embodiments, when the indication indicates that the condition has not been met, the source user terminal responds to a subsequent receipt of a new confirmation message from another remote user terminal that causes the condition to be met, by changing said indication.

In some embodiments of any of the previous methods, in advance of each source-terminal slide-show display transition, a pre-transition visual indication is provided by the source user terminal, indicating whether the condition related to the number of remote user-terminals from which the source user terminal has received a confirmation message confirming receipt of the respective post-transition picture file has respectively been met.

In some embodiments, the pre-transition visual indication is provided by a display mode of the pre-transition picture file of the display transition.

In some embodiments, the pre-transition visual indication is provided by a display mode of at least one slide-show user interface control.

A method of managing a joint slide-show by a source user terminal in communication with one or more remote user terminal(s), the slide-show for showing a plurality of picture files residing on the source user terminal, comprises: a. commencing the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and b. subsequently, locally performing one or more slide-show display-transitions at the source user terminal by replacing, at a slide-show display-location of the source user terminal, a pre-transition picture file with a post-transition picture file for each slide-show display-transition, wherein (i) a respective post-transition picture file is sent from the source user terminal to each remote user terminal in advance of the slide-show display-transition; and (ii) for each slide-show display-transition defining respective pre-transition and post-transition picture files, wherein a respective command-to-transition is sent to each remote user terminal instructing each remote user terminal to respectively perform a slide-show display transition to replace the respective pre-transition picture file with the respective post-transition picture file such that the respective command-to-transition is sent from the source user terminal concurrent with or before the sending of the respective post-transition picture file.

In some embodiments of any of the previous methods, at least one of the slide-show display-transitions is performed automatically in response to a determining that an elapsed display-time of a representation of the respective pre-transition picture file on the source user terminal exceeds a threshold value.

In some embodiments, the threshold value is set by an invitee or by a user of one of the remote user-terminals.

In some embodiments of any of the previous methods, at least one invitation is sent by the source user terminal in step (a) to an address associated with one of the remote user terminals.

In some embodiments of any of the previous methods, at least one invitation is sent by the source user terminal in step (a) to an address associated with an invitee associated with one of the remote user terminals.

In some embodiments of any of the previous methods, for each remote user terminal, the sending of each picture file from the source user terminal to the remote user terminal is contingent upon receiving, by the source user terminal from the remote user terminal, a confirmation that the remote user terminal has received one of the viewing invitation(s) and/or session-login credentials descriptive of one or more of the viewing invitation(s).

In some embodiments of any of the previous methods, an order of the displaying of the picture files is pre-determined.

In some embodiments of any of the previous methods, an order of the displaying of the picture files is random.

In some embodiments of any of the previous methods, the picture files all reside within a common folder on the source user terminal.

In some embodiments, the common folder further contains non-picture-files that are excluded from slide-show-viewing.

In some embodiments, in response to adding an additional picture file to the common folder while the slide-show is active, the source user terminal includes the additional picture file in the slide-show.

In some embodiments, in response to removal from the common folder of one or more of the picture files while the slide-show is active, the source user terminal removes the one or more removed picture files from the slide-show.

In some embodiments, the source user terminal includes in the slide-show only picture files that satisfy a viewing-condition.

In some embodiments, the viewing-condition is a function of any combination of: (i) picture-file creation date; (ii) picture-file image-resolution; (iii) picture-file file-size; (iv) picture-file name-prefix; (v) picture-file name-suffix; and (vi) picture-file file-extension.

In some embodiments of any of the previous methods the method further comprises: in response to user-input received at the source user terminal, enabling archiving of one or more of the picture file(s) of the slide-show on one or more of the remote user-terminal(s).

In some embodiments of any of the previous methods that further comprise accepting the viewing invitation(s) by the remote user-terminal(s), the accepting is performed automatically without requiring human intervention.

In some embodiments of any of the previous methods, the sending of the viewing invitation(s) by the source user terminal is triggered by an input from a user, and the method further comprises: subsequent to the invitation-sending, presenting the first picture file to the user by one of the remote user terminal(s).

In some embodiments of any of the previous methods, for each slide-show display transition associated with a respective post-transition-picture file, the source user terminal displays an indication of the number of remote user terminals from which the source user terminal has received a confirmation message confirming receipt of the respective post-transition picture file.

A source user terminal for managing a joint slide-show together with one or more remote user terminal(s) in communication therewith, the source user terminal comprises: a. computer storage for storing a plurality of picture files; b. a data port array comprising one or more data ports; c. an optional integrated display screen; and d. a control module operative to visually display information on the integrated display screen and/or on an external display screen locally coupled to the source user terminal via the data port array, wherein the control module comprises a processor executing code instructions to: i. commence the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and ii. subsequently, locally perform one or more slide-show display-transitions at the source user terminal by replacing, at a slide-show display-location of the source user terminal, a pre-transition picture file with a post-transition picture file for each slide-show display-transition, wherein: A. for each slide-show display-transition, a respective post-transition picture file is sent from the source user terminal, via data port(s) of the data port array, to each remote user terminal in advance of the slide-show display-transition; and B. each of the slide-show display-transitions is contingent upon, and performed only after meeting a condition related to a number of remote user-terminals from which the source user terminal has received via data port(s) of the data port array, a confirmation message confirming receipt of the respective post-transition picture file.

A source user terminal for managing a joint slide-show together with one or more remote user terminal(s) in communication therewith, the source user terminal comprises: a. computer storage for storing a plurality of picture files; b. a data port array comprising one or more data ports; c. an optional integrated display screen; and d. a control module operative to visually display information on the integrated display screen and/or on an external display screen locally coupled to the source user terminal via the data port array, wherein the control module comprises a processor executing code instructions to: i. commence the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and ii. subsequently, locally performing one or more slide-show display-transitions at the source user terminal by replacing, at a slide-show display-location of the source user terminal, a pre-transition picture file with a post-transition picture file for each slide-show display-transition, wherein: A. for each slide-show display-transition, a respective post-transition picture file is sent from the source user terminal, via data port(s) of the data port array, to the remote user terminal in advance of the slide-show display-transition; and B. following each source-terminal slide-show display transition and in response thereto, a post-transition visual indication is provided by the source user terminal, indicating whether or not a condition has been met, the condition being related to a number of remote user-terminals from which the source user terminal has received, via data port(s) of the data port array, a confirmation message confirming receipt of the respective post-transition picture file.

A source user terminal for managing a joint slide-show together with one or more remote user terminal(s) in communication therewith, the source user terminal comprises:

a. computer storage for storing a plurality of picture files; b. a data port array comprising one or more data ports; c. an optional integrated display screen; and d. a control module operative to visually display information on the integrated display screen and/or on an external display screen locally coupled to the source user terminal via the data port array, wherein the control module comprises a processor executing code to: i. commencing the slide-show by (i) for each given remote user terminal of the one or more remote user terminal(s), sending from the source user terminal a viewing invitation to the given remote user terminal and/or to a respective invitee associated with the given remote user terminal; (ii) displaying a first of the picture files on the source user terminal; and (iii) sending the first picture file to each remote user terminal; and ii. subsequently, locally performing one or more slide-show display-transitions at the source user terminal by replacing, at a slide-show display-location of the source user terminal, a pre-transition picture file with a post-transition picture file for each slide-show display-transition, wherein: A. for each slide-show display-transition, a respective post-transition picture file is sent from the source user terminal, via data port(s) of the data port array, to each remote user terminal in advance of the slide-show display-transition; and B. for each slide-show display-transition defining respective pre-transition and post-transition picture files, a respective command-to-transition is sent to each remote user terminal, via data port(s) of the data port array, instructing each remote user terminal to respectively perform a slide-show display transition to replace the respective pre-transition picture file with the respective post-transition picture file such that the respective command-to-transition is sent from the source user terminal concurrent with or before the sending of the respective post-transition picture file.

In some embodiments, one or more of the following features are provided: (A) There is no hard connection between the points in time in which pictures are switched in the slide-show and the transmission of the pictures' contents to the remote computer(s). Commands to switch to a new picture may be sent while the new picture's file is still being transmitted to the remote computer(s), and the transmission of a picture's contents from the first person to the remote computer(s) does not have to wait for that picture to be displayed on the first person's screen but can occur in advance while he is still viewing a previous picture. This avoids a long delay when sharing over a bandwidth-limited network; and (B) no special preparations, except for putting the pictures in a common folder and launching a software application, are required. Specifically, in different embodiments, there is no need to insert the pictures or their links into another file (e.g. a 'container file' hosting the picture data-objects—e.g. a .pdf file or a PowerPoint® file).

BRIEF DESCRIPTION OF THE DRAWINGS

FIG. 1 illustrates a prior art device for an electronic slide show (PRIOR ART).

FIG. 2 illustrates four example pictures (PRIOR ART).

FIGS. 3A-3D, 4, and 5 relates to one prior art scenario for an electronic slide show (PRIOR ART).

FIGS. 11A-11F, 12A-12D, 13A-13E and 15A-15E illustrate various use-scenarios related to remote slide shows.

DETAILED DESCRIPTION OF EMBODIMENTS

The claims below will be better understood by referring to the present detailed description of example embodiments with reference to the figures. The description, embodiments and figures are not to be taken as limiting the scope of the claims. It should be understood that not every feature of the presently disclosed methods, apparatuses, and computer readable media having stored thereon computer code is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to'), rather than the mandatory sense (i.e. meaning "must").

Figure 3A:
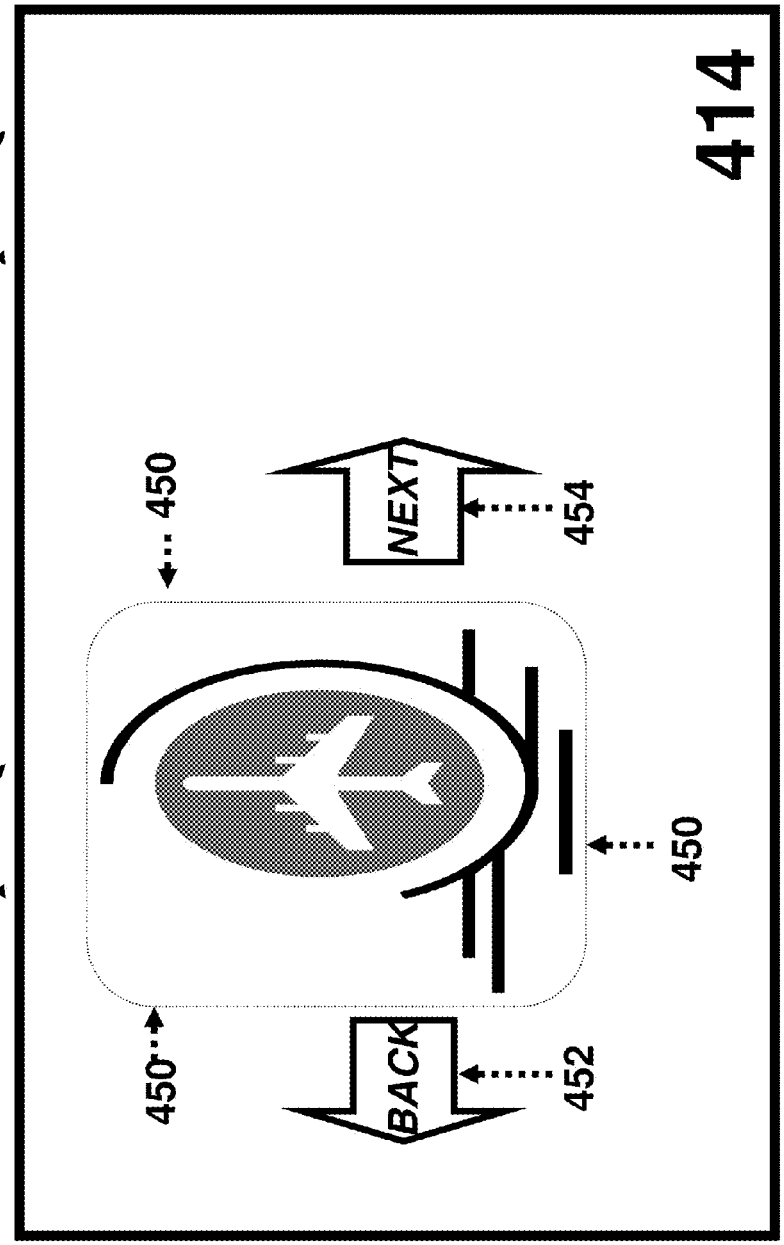
Figure 5:
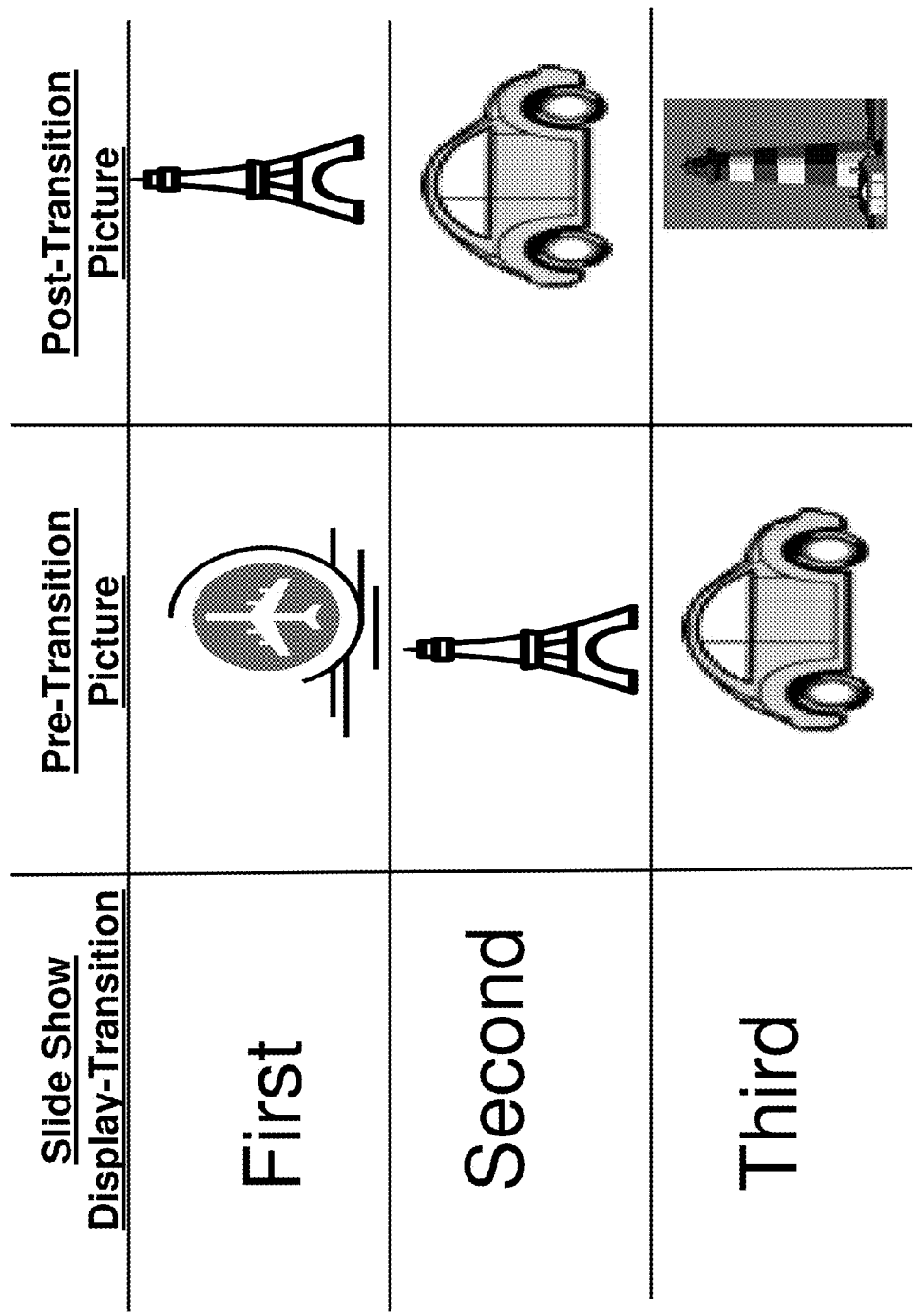
Figure 6:
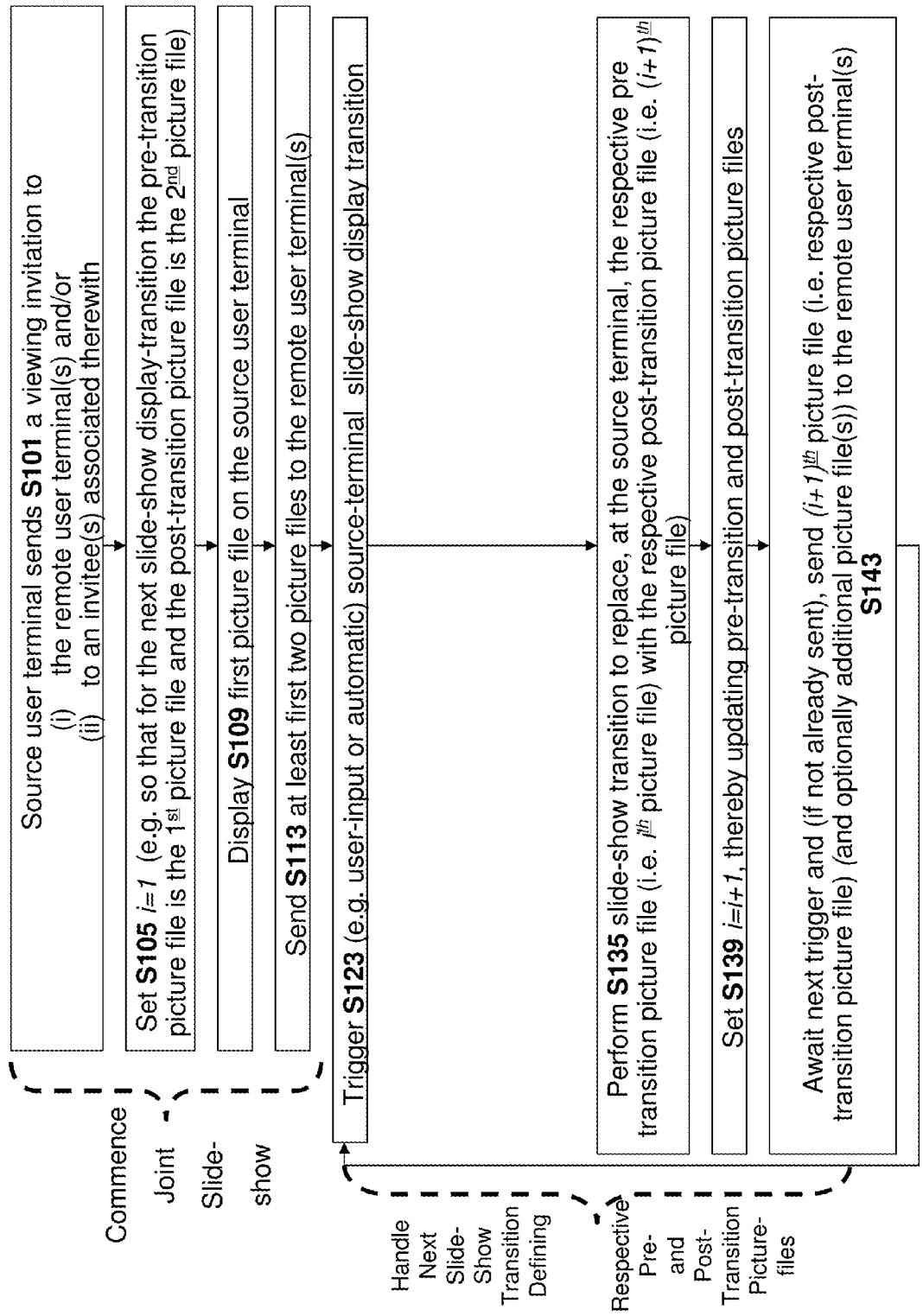
FIGS. 6, 10A-10B, 14A-14B, 16 and 17 are flow charts of methods for managing a joint slide show between a source user terminal and one or more remote user terminal(s).
Figure 7:
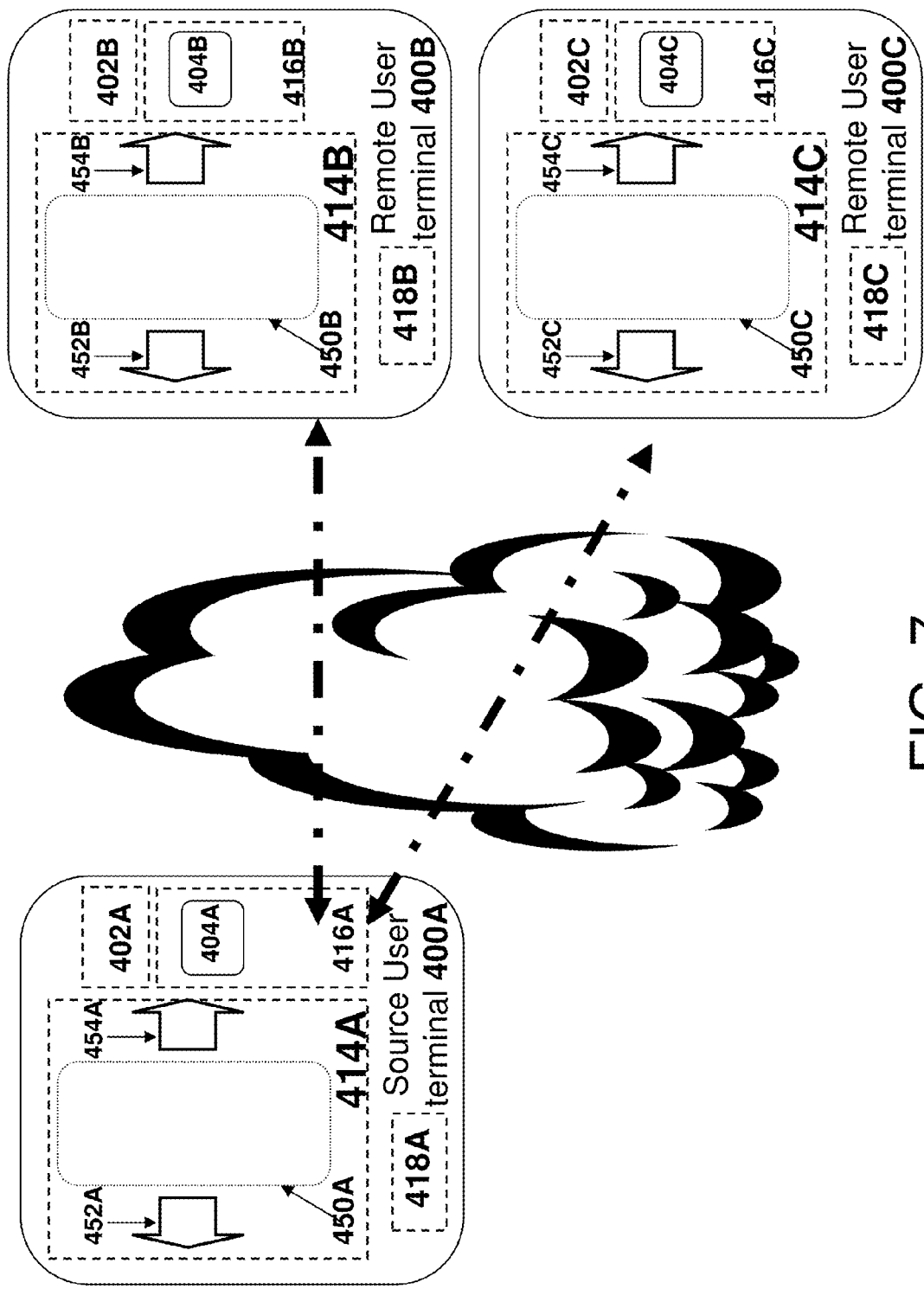
FIG. 7 illustrates a system for a joint slide show between a source user terminal and one or more remote user terminal(s).

Reference is now made to FIGS. 6-7. FIG. 6 is a flowchart of a method for managing a joint slide show between a source user terminal 400A and one or more remote user terminal(s) 400B, 400C (e.g. via a packet-switched network such as the Internet).

FIG. 7 illustrates a system where the method of FIG. 6 may be performed. Each terminal 400 includes (or is in local communication with) a respective display-screen 414, respective storage 416 where a respective 'slide-show' software application 404 is stored, a respective communications module 402 (i.e. for communicating over a local or remote computer network), and a respective user-input device 418. Each given user terminal 400A-400C may be operated by a respective user (NOT SHOWN) local to the given user terminal. Each user terminal 400 is a digital computer and have any suitable form-factor—in different examples, any user terminal 400 may be a laptop computer, a desktop computer, a tablet device, a personal digital assistant (PDS) or a mobile phone.

FIG. 7 relates to the specific case where source user-terminal 400A is in communication with (and manages a joint slide-show with) two remote user-terminals 400B-400C—this is not a limitation and in different embodiments the number of remote terminals may be any positive integer.

Computer storage 416 may include any combination of volatile (e.g. RAM) and/or non-volatile storage (e.g. flash or magnetic medium). Each user terminal also includes respective microprocessor(s) for executing code of the slide-show application 404.

Figure 9A:
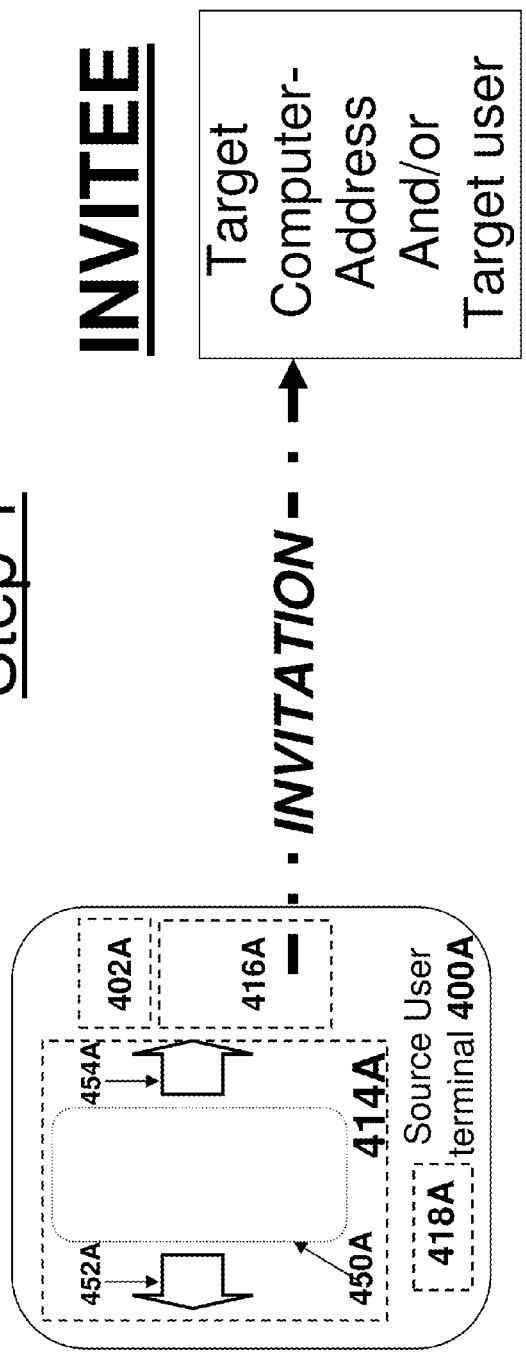
Figure 9B:
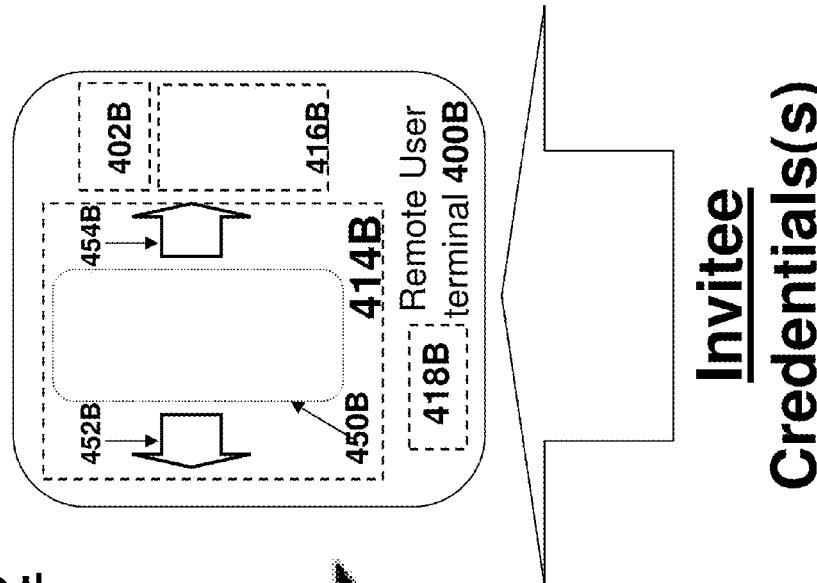

Joint slide-shows may commence by sending viewing invitations to one or more remote user terminal(s) 400B-400C. FIGS. 9A-9B relate to 'viewing' invitations—invitations to view the slide-show—sent from the source terminal 400A to (i) one or more remote user terminal(s) or (ii) one or more 'invitees' historically or currently associated with the remote user terminal(s) or invitee(s) that will, in the future, be associated with the remote user terminal(s) 400B-400C.

When remote terminal(s) are in communication with each other via a computer network (e.g. packet-switched network), the transit time of each picture file from the source user terminal 400A to the remote user terminal(s) 400B-400C is not always known in advance. Even if remote picture file(s) are streamed in advance of viewing on the source user terminal 400A, when the user of the source user terminal(s) 'advances' within the slide show to a view a new picture file, s/he may lack awareness of which remote terminal(s) (if any) have received this 'new' picture file.

FIGS. 10-13 relate to embodiments where application 404A prevents a source-terminal slide-show from occurring unless a condition "remote-terminal confirmation-message-condition" is met. In one non-limiting example, source terminal 400A is in communication with a single remote terminal 400B—an attempt is made by a user of the source terminal 400A to 'advance' to the next slide (e.g. by engaging GUI control 454A) to replace a 'current' picture-file with a new picture-file (e.g. the next one in a sequence) to effect a 'slide-show display transition' at source terminal 400A. Source terminal 400A determines if the remote terminal 400B has already received the 'new' picture-file (i.e. if a 'confirmation message' has been received from the remote terminal 400B indicating that the new picture file has been received by remote terminal 400B)—only if remote terminal 400B has received the new picture-file does the source terminal 400A allow the requested slide-show display transition to occur. In this manner, in contrast to the 'unconditional' slide-show display transitions described above with reference to FIGS. 1-5, the slide-show display transition is conditional: contingent upon, and performed only after the source user terminal 400A receiving a confirmation from the remote user terminal 400B that the 'new' picture file has been received by the remote user terminal 400B. This is one specific example related to more general cases, discussed below with reference to FIGS. 10-13.

FIGS. 14-15 also relate to attempts to effect a slide-show display transition at source terminal 400A. In the example of FIGS. 10-13, the slide-show display transition is prevented unless a condition related to 'remote terminal receipt' of the new picture file (and related to source terminal 400A receipt of the appropriate confirmation message) is met. In the example of FIGS. 14-15 such slide-show display transitions may be permitted even if such a condition is not met. However, after such a 'potentially-problematic' slide-show display transition (i.e. problematic because confirmations of receipt of the new picture file by one or more remote terminal(s) 'should have' been received by the source terminal 400A before the slide-show display transition), a warning is provided on a user interface of source terminal 400A. This warning indicates a problematic situation related to failure of the source terminal 400A to receive the requisite confirmations from one or more remote terminal(s) in advance of the slide-show display transition which was performed despite this failure.

Figure 16:
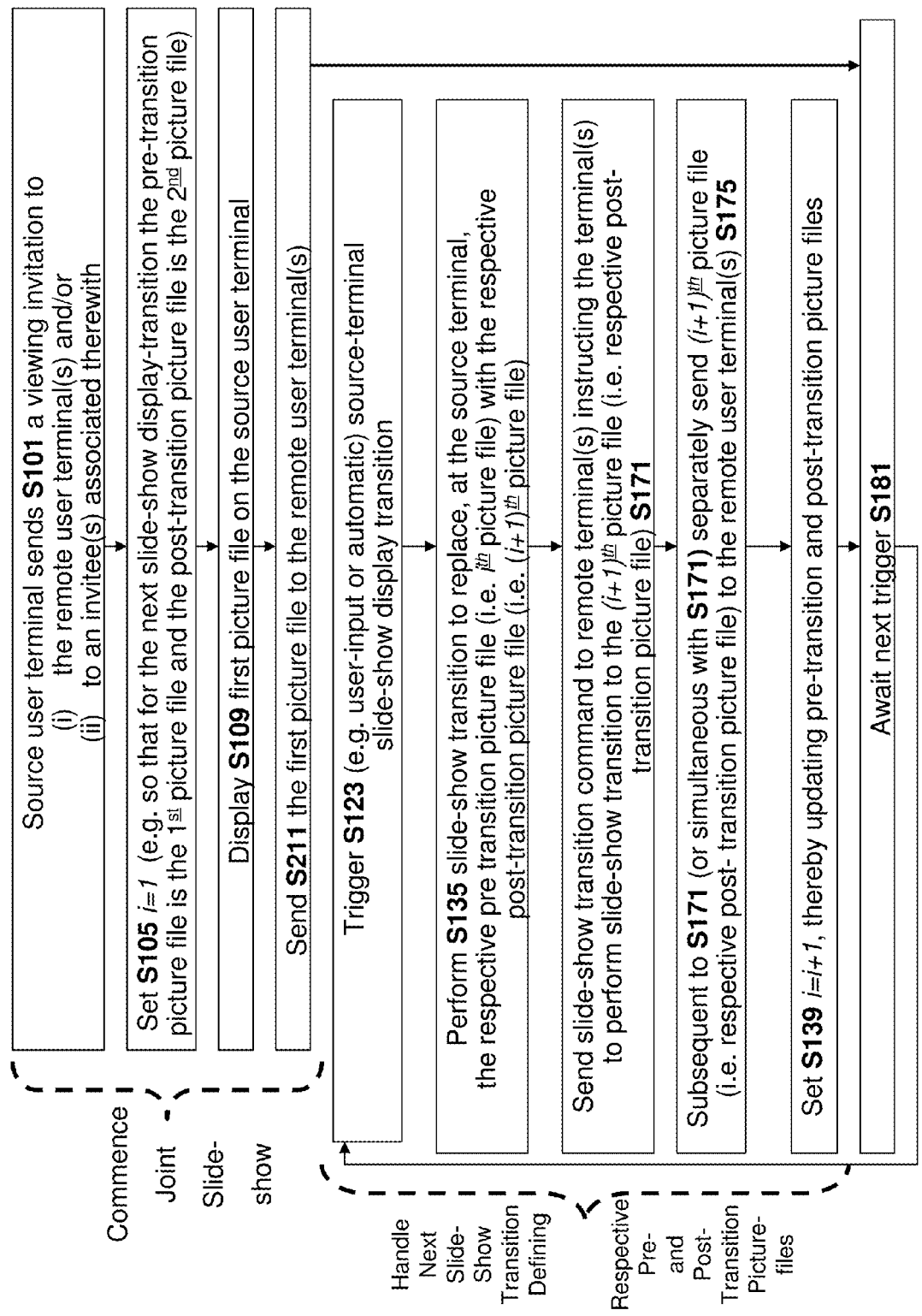
Figure 17:
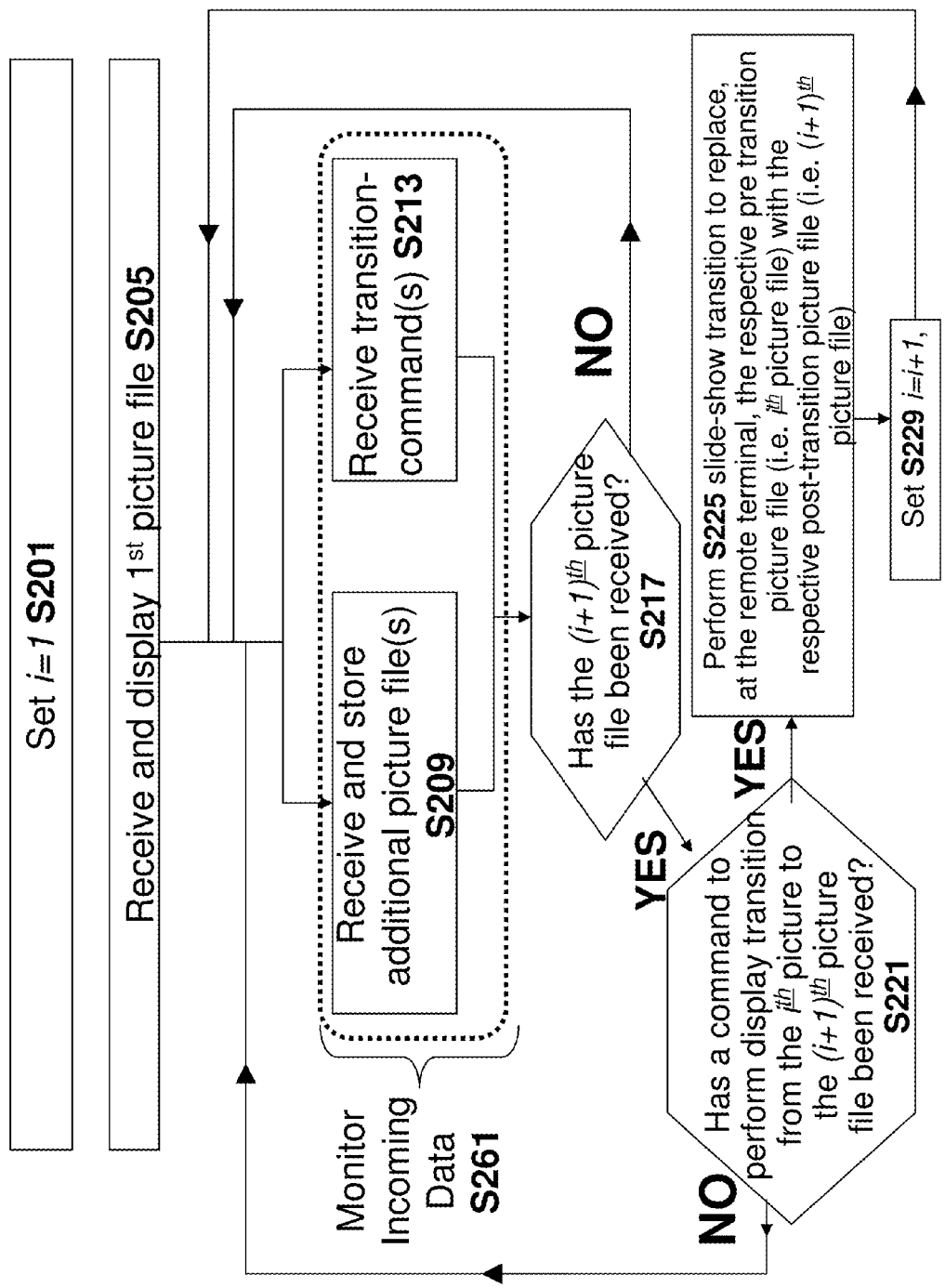

FIGS. 16-17 relate to another embodiment where 'commands to display' the picture file at remote terminal(s) 400B-400C are sent to the remote terminal(s) 400B-400C separately from the actual picture files. FIG. 16 is the method performed by source terminal 400A and FIG. 17 is the method performed by the remote terminal(s) 400B.

Before discussing the specific steps S101-S143 of FIG. 6, a non-limiting use case related, according to some embodiments, to joint slide shows between the source user terminal 400A and one or more remote user terminal(s) 400B is presented.

Example Use-Case

According to this example use-case a copy of software application 404 executes on each of the user terminals 400A-C. In this non-limiting use-case scenario, a plurality of picture files reside within storage 416A of the source user terminal 400. For the present disclosure, displaying 'a picture file' entails displaying the visual image digitally encoded by the picture file on a display screen.

According to the presently-discussed non-limiting example use-case, before initiating the remote slides show/sharing scenario, the user of source terminal 400A (the 'initiator') puts all of the picture files in a common folder on source terminal 400A (i.e. in storage 416A thereof). The initiator then launches the application 404A on source user terminal 400A and causes source user terminal 400A to send an invitation to one or more remote user(s) and/or to one or more remote terminal(s) 400B/400C (or to one or more user(s) associated with the remote terminal(s)) to view a slide-show of the pictures. Methods for initiating and maintaining a joint communication session between multiple users over a network are very well known in the art. Any such method, as used in tools for video conferencing, audio conferencing, desktop sharing, file sharing and other similar utilities may be used.

Once a connection with a remote user terminal(s) 400B (or 400C) is established, the picture files in the designated folder start being streamed to the remote user terminal(s). The source terminal 400A may immediately start running the slide-show or may delay until receiving confirmation of receipt of picture file(s) by remote terminal(s) through the network.

In some embodiments related to automatically-triggered display-transitions, the slide-show runs automatically (unless stopped by a user, as will be explained below) on each of the terminals 400A-400C according to parameters pre-defined by the initiator—duration of time for each picture to be displayed, transition effect between successive pictures, etc. Optionally, it may be possible for the initiator to dynamically (while the slide-show is running) add pictures to the joint remote slide show or remove pictures from the joint remote slide show by adding or deleting picture files to/from the folder within storage 416A from which the show is created. The initiator may also operate source terminal 400A to apply (dynamically or statically) filtering to the pictures to be included in the slide-show, for example asking to show only files newer than a given date (for example to show only files created later than a week ago), only files having a resolution higher than a given resolution (for example to show only files having a resolution of at least 3 megapixels), only files having a size smaller than a given size (for example to show only files smaller than 2 megabytes), only files whose name starts with a given prefix (for example to show only files created by cameras of a certain vendor where all such pictures start with a prefix of "DSCF"), only files whose name ends with a given suffix (for example to show only files having names ending with "0"), only files which have a given file extension (for example to show only files having a "JPG" extension), etc.

In one particular example, application 404B (or 404C) executing on the remote terminal receives and buffers the streamed picture files and displays each of them on display screen 414B (or 414C) when instructed to do so by a command sent by the initiator's computer on each transition of pictures. As the only thing transmitted at a transition time is a very short command (i.e. according to this particular example), the network delay is minimal. If a transition command is received at a remote user terminal 400B (or 400C) before the picture to be displayed is available locally (as might be the case when the initiator starts the slide-show without waiting for the remote user terminal to buffer enough content, or when a new remote user terminal joins an already on-going session), then the remote user terminal 400B (or 400C) will notice some delay, but this delay will disappear with the next picture transitions as the next pictures are streamed in parallel with the displaying of the current picture.

A remote software application 404B (or 404C) may provide status indicators to the software application 404A executing on the source terminal 400A indicating which of the picture files in the slide-show is currently already available for immediate display at the remote computer, so that the initiator (i.e. operating source terminal 400A) can decide to delay starting the show or delay a picture transition by freezing the show until there is an indication the remote peer (i.e. operating one of the remote terminal(s) 400B-400C) can immediately follow it. Additionally or alternatively, a remote application 404B (or 404C) operating on remote terminal 400B (or 400C) can send back to the source terminal 400A a confirmation that a given picture file was received and displayed (i.e. on 414B (or 414C)) to a user of the remote user terminal 400B (or 400C) (i.e. 'remote peer'). This confirmation can be displayed to the initiator (i.e. the user operating source terminal 400A) so that s/he has definitive knowledge if the picture file s/he is currently viewing on display-screen 414A and talking about has indeed reached the remove user terminal(s) 400B (or 400C) and is available for viewing on the screen 414B (or 414C) of the remote user terminal(s).

The sharing session may be accompanied by an open audio channel, either provided by the slide-show sharing application or an independent one. The audio channel may be used by the initiator for providing comments and explanations and by a remote peer for asking questions.

In this use-case, the initiator may operate source terminal 400A (i.e. using user input device 418A) to freeze the slide-show whenever s/he wants, in order to have more time for his/her explanations. The initiator may enable remote peers (i.e. users of remote terminal(s) 400B (or 400C)), collectively or individually, to initiate requests for freezing and unfreezing a slide-show (i.e. via input device 418B or 418C), for example to be used for asking questions. Additionally, the initiator may enable remote peers, collectively or individually, to copy pictures from the slide-show to their remote terminal 400B (or 400C). This enabling may be for all pictures together or individually for each picture. For example, if enabled a remote peer may double click on the currently displayed picture to have it copied to a pre-designated folder in his computer.

Additionally, the initiator may enable remote peers, collectively or individually, to add text comments or audio comments to a picture using input-devices 418B (or 418C) of the remote terminals 400B (or 400C). If such a comment is added, it will become part of the metadata associated with the picture's file in the source user terminal 400A.

Additionally, the initiator may enable remote user terminal(s) (and remote 'peers' operating the remote user terminal(s)), collectively or individually, to have other functionalities in controlling or using the slide-show. For example, the remote user terminals may be allowed to control the transition rate of the pictures in the slide-show (this feature may be useful in the VDPF use case described below).

The slide-show sharing application 400A (or 400B or 400C) may be an independent application or embedded within another application providing other sharing functionality, such as a video conferencing application.

The procedure described above may be used to create a "virtual digital photo frame" (VDPF)—one can see on his screen a continuously running slide-show of pictures of his selected favorite pictures. A possible use case for this VPDF functionality is for a person to establish a sharing session between his home computer and his/her work computer in his/her office. Every morning before leaving home s/he may choose one folder from his/her personal pictures collection s/he would like to view on that day. When sitting at his/her desk at work s/he will then see a slide-show of his/her daily favorite pictures. For such a use case, the initiator will select a mode of continuously running the slide-show in an infinite loop, rather than the one-time mode typically used for interactively showing one's pictures to a friend. Also, such use case requires an operating mode in which no human presence is required for accepting an invitation to share a slide-show, as the inviter and the invitee are the same person that cannot simultaneously be present at two locations at the same time.

The continuously running slide-show may run according to some ordering of the pictures in the folder (for example according to ascending file dates or according to alphabetic order of file names), with the last picture according to that ordering being followed by the first picture according to that ordering. This way the slide-show runs in an infinite loop, with each picture repeating with a fixed time interval. Alternatively, the slide-show may continuously run in an infinite loop with a random order where a random selection is being made before each transition time for selecting the picture to follow. In such case each picture is displayed infinitely many times but with different time intervals between successive shows.

When using the VPDF scenario is it advantageous to enable the remote computer (the one in the office in the above example) to set the transition time of the pictures, as the slide-show is only viewed at that computer.

Definitions

Within this application the following terms should be understood to have the following meaning:

"computer"—Any device having computing power and some sort of communication ability, including but not limited to a personal computer, a laptop, a tablet, a phone, a TV set and a set-top box. One example of a 'computer' is user terminal 400—e.g. source user terminal or any of the remote user terminal(s).

"picture file"—A digital file containing a representation of a picture, regardless of the file format used and regardless if the file contains additional data.

"folder"—A grouping of files within a file system sharing a common logical location in the file system's structure. Includes, but is not limited to, what is referred to by the terms "folder", "directory" and "subdirectory" in common operating systems.

"invitee"—Refers to a human user or to a computer account or to a computer. An 'invitee' is identified by an 'identifier.' In different examples, this identifier may be (i) a name of the user, or (ii) a URL or (iii) an identifier of a computer account owned by the user (e.g. email account or social network account) or (iv) a network address. This 'user identifier' may be specified by a sender of an invitation within the invitation or in a data structure linked to the invitation—e.g. the invitation may be directed to (e.g. electronically routed to) a computer or a user-account specified by the 'identifier.'

When an 'invitee' is 'associated with' a user terminal, at some point in time an 'association event' occurs such that (i) the user terminal is employed to access a computer account specified by an 'identifier' of the 'invitee' and/or (ii) the user (e.g. human user) uses the user terminal—i.e. employs the display 414 of the user terminal and/or employs the user-input device 418 of the user terminal.

The 'association event' between the 'invitee' and the 'user terminal' may occur at any point in time, and may, in some examples, only occur after the 'source user terminal' has sent the invitation to the invitee.

An 'association' between a 'invitee' and a 'user terminal' is not required to be 1:1—for example, more than one user terminal may be used by a human user as is the case when more than one user terminal is used to access an email account or social networking account. Alternatively, more than one human user may use a single 'common' user terminal, as is the case when multiple users access their corresponding email account or social networking account from the same terminal.

"displaying a picture file in a computer"—Showing a visual image of the picture encoded in the picture file on a display, where the display is either embedded within the computer or connected to it by a wired or wireless channel. The image does not have to be of the same resolution as the resolution encoded in the picture file (so that displaying a picture file encoding a high-resolution picture as a low-resolution image is within the scope of the term), and it also does not have to be of the same colors encoded in the picture file (so that displaying a picture file encoding a color picture as a black and white image is within the scope of the term). Also, the image does not have to show the complete picture encoded in the picture file, so that displaying a portion of the encoded picture is within the scope of the term.

"transferring a file"—The process of sending the contents of a file from a sending location to a receiving location so that after completing the operation the file contents are available at the receiving location. The sending may employ any electronic communication method, regardless of being wired or wireless, regardless of being point-to-point or networked, and regardless of being unicast, multicast or broadcast.

"command to display a picture file"—an explicit message instructing its recipient computer(s) to display a picture file. This excludes cases in which a picture file is transferred to its recipient computer(s) with the implied understanding that it should be immediately displayed once the transfer is complete.

Discussion of FIG. 6-13

FIG. 6 is a flow-chart of a method for managing a joint slide show between a source user terminal 400A and one or more remote user terminal(s) 400B, 400C (e.g. via a packet-switched network such as the Internet). FIG. 7 illustrates a system where the method of FIG. 6 may be performed. In one example, source user terminal 400A is in remote communication with only a single remote user terminal 400B. In another example and as shown in FIG. 7, source user terminal 400A is in remote communication with multiple remote user terminals 400B-400C (i.e. two or more).

In FIG. 6, at any given time the 'current picture file' is the $i^{th}$ picture file (i.e. for the 'first picture file i=1, for the second picture file i=2, and so on) displayed at the display location 450 of display screen 414A of source terminal 400A.

In step S101, source user terminal 400A sends a viewing invitation to the remote user terminal(s) 400B (and optionally to at least one more remote user terminal—e.g. 400C) and/or to an invitee(s) associated with the remote user terminal 400B (and optionally 400C). In step S105, a value of i is set to 1—thus, the first picture file is displayed at the display location 450 of display screen 414A of source terminal 400A in step S109.

Once i=1 in step S105, for the subsequent slide-show display-transition, the pre-transition picture file is the first picture file and the post-transition picture file is the second picture file.

In step S113, at least the first two picture files are sent to each of the remote user terminals. Although step S113 is illustrated in the flow-chart as being performed after steps S101-S109 this is not a limitation, and any portion (or any entirety) of step S113 may be performed before or simultaneous with any of steps S101-S109.

In step S123 a slide-show display transition is triggered—e.g. manually by user engagement of a GUI control or automatically. In response to the triggering of the slide-show display transition, the slide-show display transition occurs to replace, at the display location 450 of the display device 414 of source terminal 400, the respective pre transition picture file (i.e. $i^{th}$ picture file) with the respective post-transition picture file (i.e. $(i+1)^{th}$ picture file). In step S139, the value of i is set i=i+1, thereby updating pre-transition and post-transition picture files.

In step S143, next trigger is awaited and if not already sent, the $(i+1)^{th}$ picture file (i.e. respective post-transition picture file) (and optionally additional picture file(s)) is sent to the remote user terminal(s)).

Figure 8:
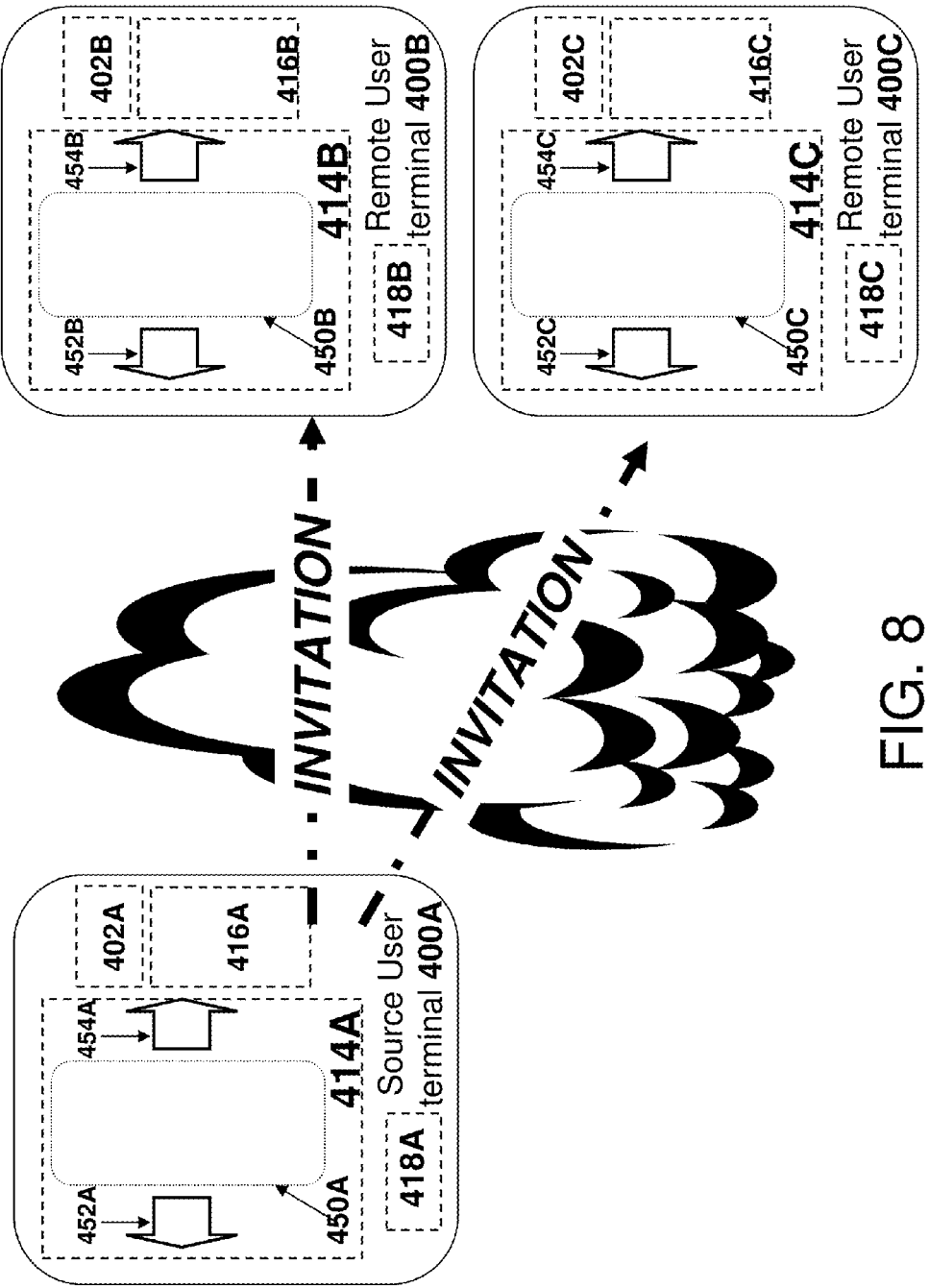
FIGS. 8 and 9A-9B relate to sending of an invitation for viewing the slide show.

Step S101 of FIG. 6 relates to the sending of the viewing invitation. Some examples of this are now explained with reference to FIGS. 8 and 9A-9B. In FIG. 8, a respective viewing invitation is sent to every remote terminal.

In some embodiments, a viewing invitation is sent in step S101 to the remote user terminal(s) 400B-400C. Alternatively or additionally, as shown in FIGS. 9A-9B, the viewing invitation may be sent to 'invitees' historically or currently associated with the remote user terminal(s) or invitee(s) that will, in the future, be associated with the remote user terminal(s) 400B-400C.

In FIG. 9A, a viewing invitation is sent to an 'invitee'—in specific non-limiting examples, the invitation may be sent to an email address or a social-networking account or to an IP address associated with one or more remote user terminal(s). Subsequently, in FIG. 9B the invitee (e.g. the human owner of the 'computer account identifier'—for example, an owner of the email account) presents credentials to the remote user terminal 400B so as to create an 'association' between the invitee and the remote user terminal. For example, the user may log onto his/her email account from the remote user terminal 400B. It is noted that when an 'invitee' is associated with a remote user terminal this is not required to be a one-to-one relationship. In one example, more than one invitee may be associates with a single remote terminal—e.g. a user logs onto multiple gmail accounts to open up multiple 'viewing invitations' from the same source user terminal. In another example, log-ins to a single gmail account (containing a viewing invitation) are performed from multiple remote user terminal(s) 400B-400C.

Figure 10A:
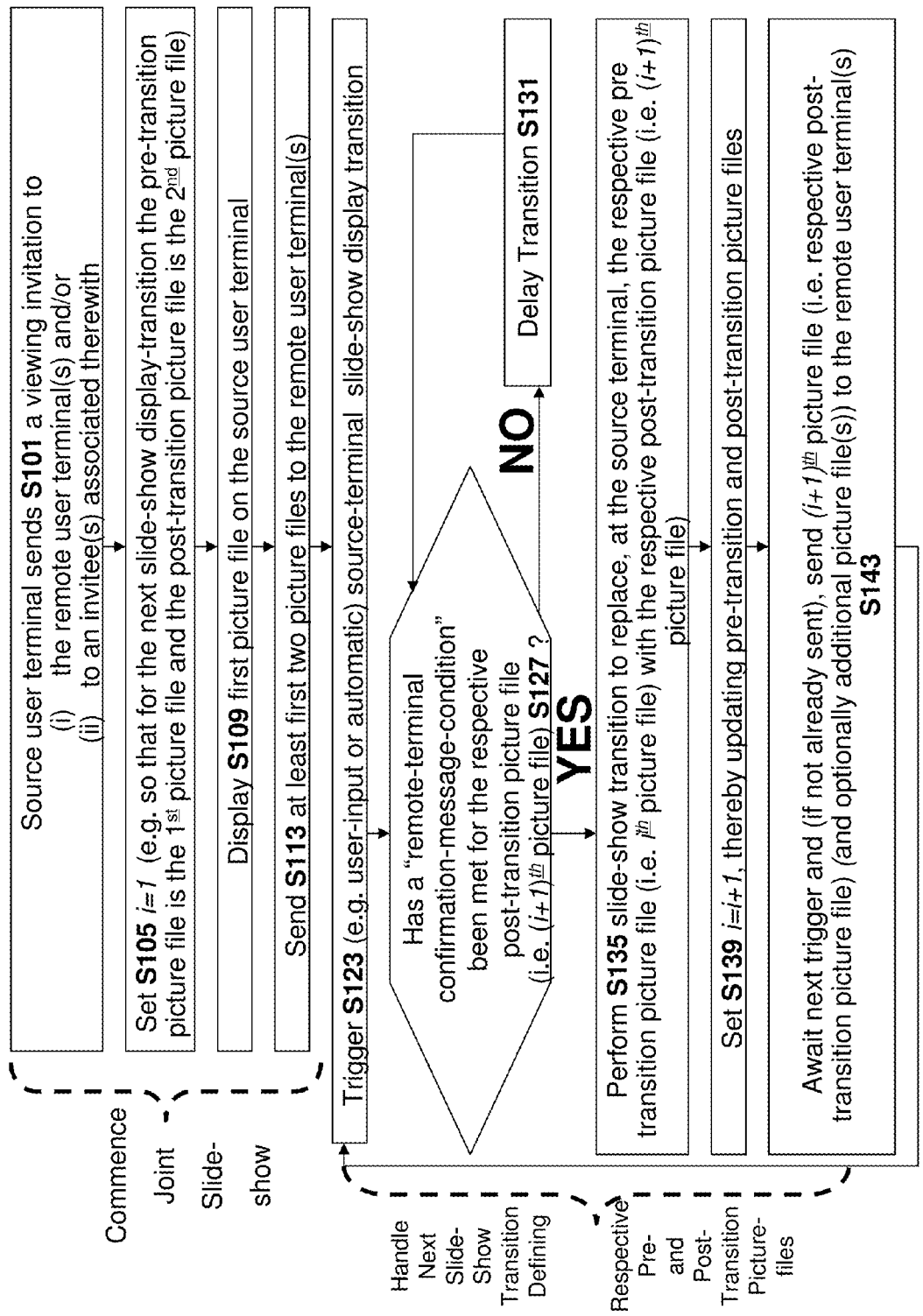
Figure 10B:
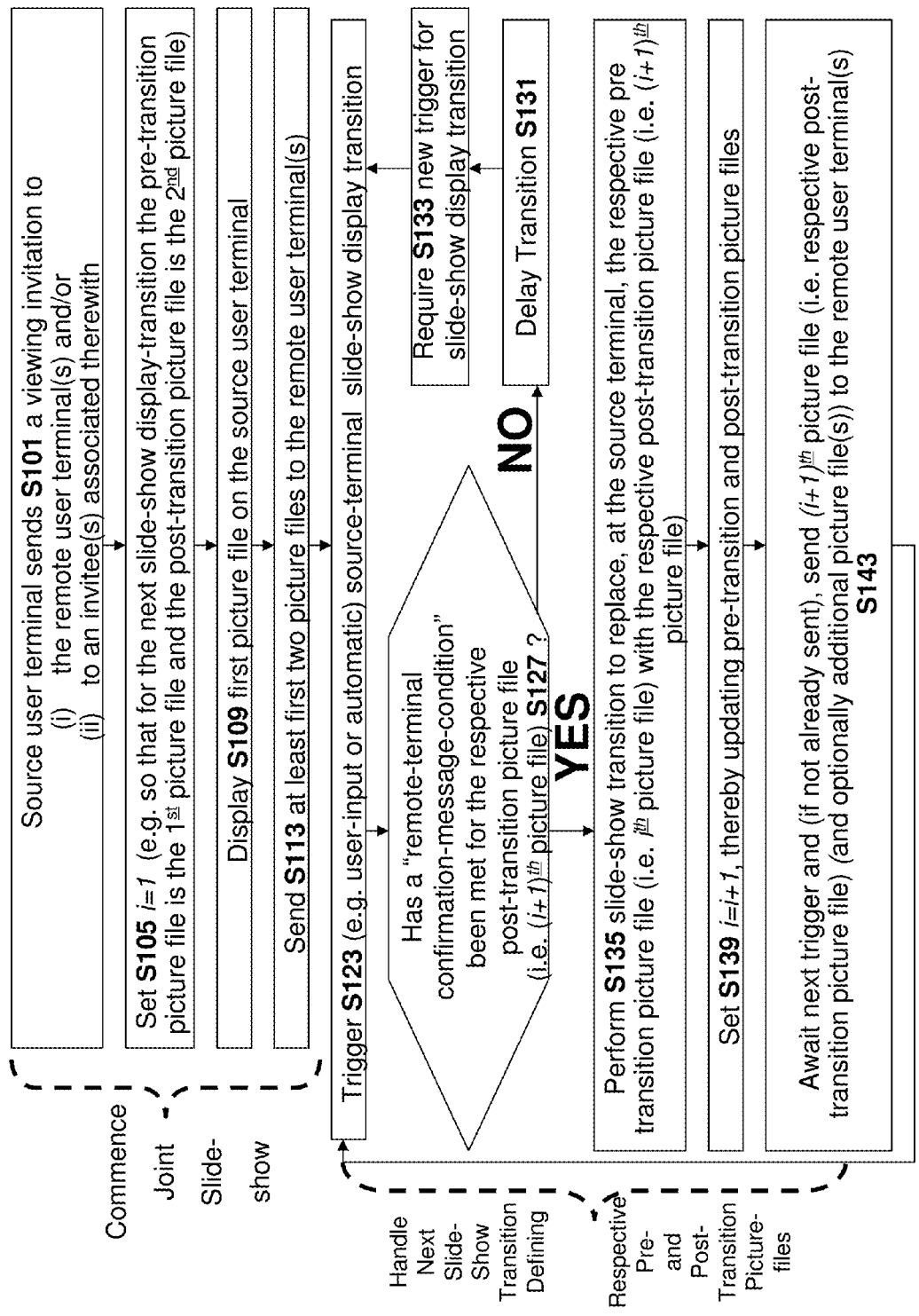

FIG. 10A-10B are flow charts of methods whereby (i) a post-transition picture file is sent from the source terminal to each remote user terminal in advance of a slide-show display transition and (ii) the slide-show display transition is conditional. In other words, each of the slide-show display-transitions is contingent upon, and performed only after meeting a condition related to a number of remote user-terminals from which the source terminal has received a confirmation message confirming receipt of the respective post-transition picture file.

FIGS. 11-13 relate to specific examples/scenarios where the methods of FIGS. 10A-10B are performed.

Steps S101, S105, S109, S113, S123, S135, S139 and S143 of FIGS. 10A-10B correspond to these steps in FIG. 6. In step S127 of FIG. 10A, in order to proceed with the slide-show display transition of step S135, a certain condition must be met in step S127. In particular, whenever a remote terminal receives a picture file, an acknowledgement message is sent back to the source terminal confirming receipt of the picture file.

Thus, in step S127 of FIG. 10A, the slide-show display transition is only performed if a 'remote-terminal confirmation-condition' has been met for the respective post-transition picture file of the slide-show display transition of step S123.

This remote-terminal confirmation-condition typically relates to a number of remote terminals from which the source terminal has received acknowledgment of receipt of the respective post-transition picture file.

In a first example, source user terminal 400A is in communication with a plurality of remote user-terminals, and the condition requires receipt of confirmation messages from a majority of the remote user terminals. In a second example, source user terminal 400A is in communication with a plurality of remote user-terminals, and the condition requires receipt of confirmation messages from every remote user terminal. In a third example, source user terminal 400A is in communication with a plurality of remote user-terminals, and the condition requires receipt of confirmation messages from at least one of the remote user terminals. In a fourth example, the source user terminal is in communication with only a single remote user terminal, and the condition requires receipt of a confirmation message from the single remote user-terminal.

Thus, if the condition is met in step S127, it is possible to proceed to the slide-show display-transition in step S135. Otherwise, in step S131, this slide-show display-transition is delayed. For example, even if the user engages the GUI control (e.g. the 'next' arrow 454A of source terminal 400A) to 'trigger' the slide-show display transition, the source terminal refuses to perform the slide-show display-transition if the 'condition' of step 127 is not met.

In one example (FIG. 10A), once the trigger of step S123 is produced, the user of source terminal 400A simply needs to wait until the 'remote-terminal-confirmation-condition' of step S127 is met—once that happens, the slide-show display-transition is performed at source terminal 400A.

In another example (FIG. 10B), if the trigger of step S123 is produced before the 'remote-terminal-confirmation-condition' of step S127 is met, then even once the 'remote-terminal-confirmation-condition' of step S127 is met, a new trigger is required (step S133) to proceed with the slide-show display-transition of step S135.

As noted above, FIGS. 11-13 relate to specific examples/scenarios where the methods of FIGS. 10A-10B are performed.

In "Scenario A" of FIGS. 11A-11F, there is a requirement (i.e. as in FIGS. 10A-10B) to meet a remote-terminal-confirmation-condition in order to perform the slide-show display-transition at the source terminal—however FIGS. 11A-11F relate to a 'successful scenario' where the remote-terminal confirmation-message-condition has already been met when the slide-show display-transition is requested. As such, no attempt is made to prevent or delay the slide-show display-transition. This contrasts with 'Scenario B' of FIGS. 12A-12D and with 'Scenario C' of FIGS. 13A-13E where failure to meet the remote-terminal confirmation-message-condition delays and/or prevents the slide-show display-transition at source terminal 400A. In all three scenarios the remote-terminal confirmation-message-condition may be any of the conditions mentioned above—confirmation messages were received from a majority of the remote user terminals, from all the remote user terminals or from at least one of the remote user terminals.

Figure 11A:
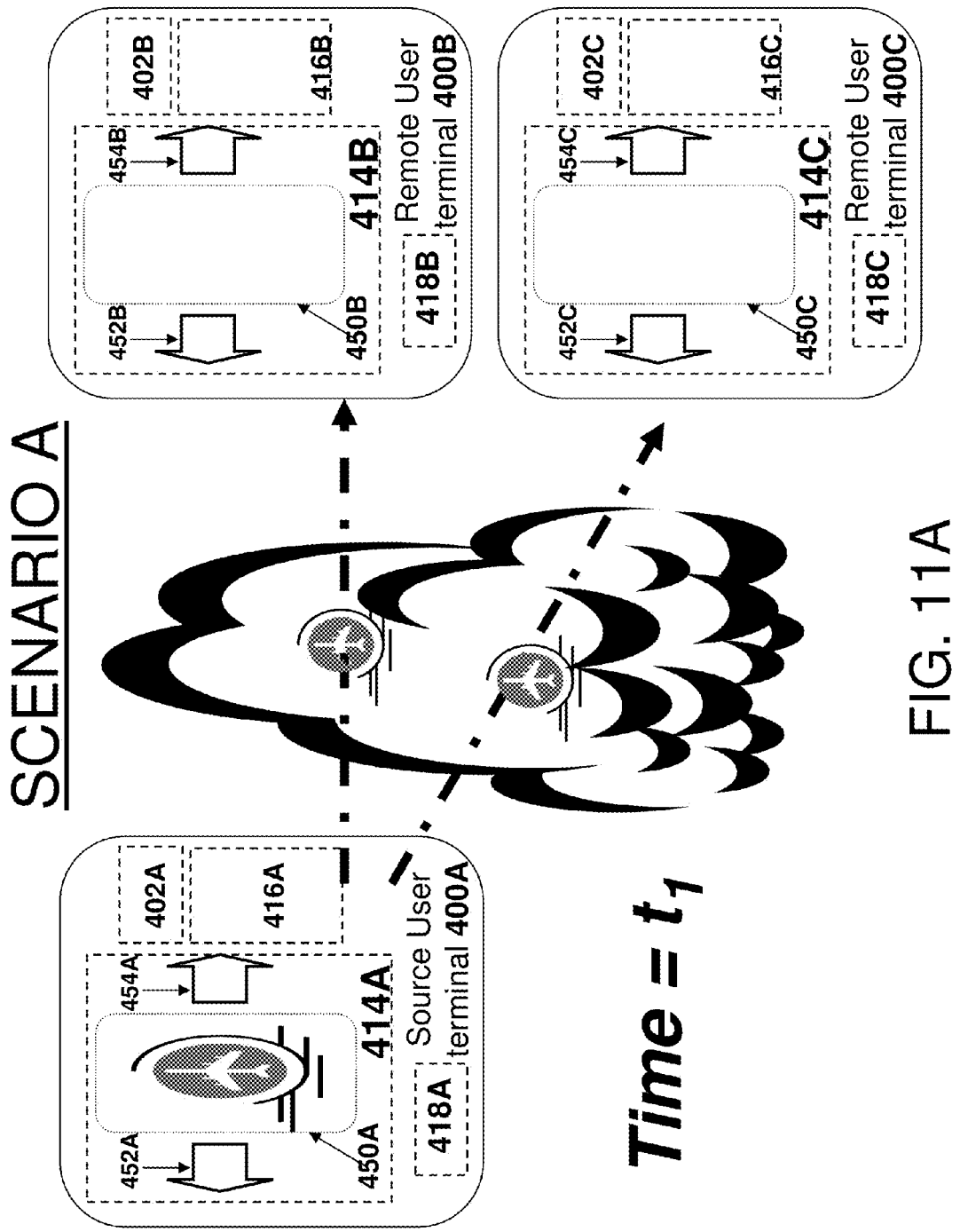
Figure 11B:
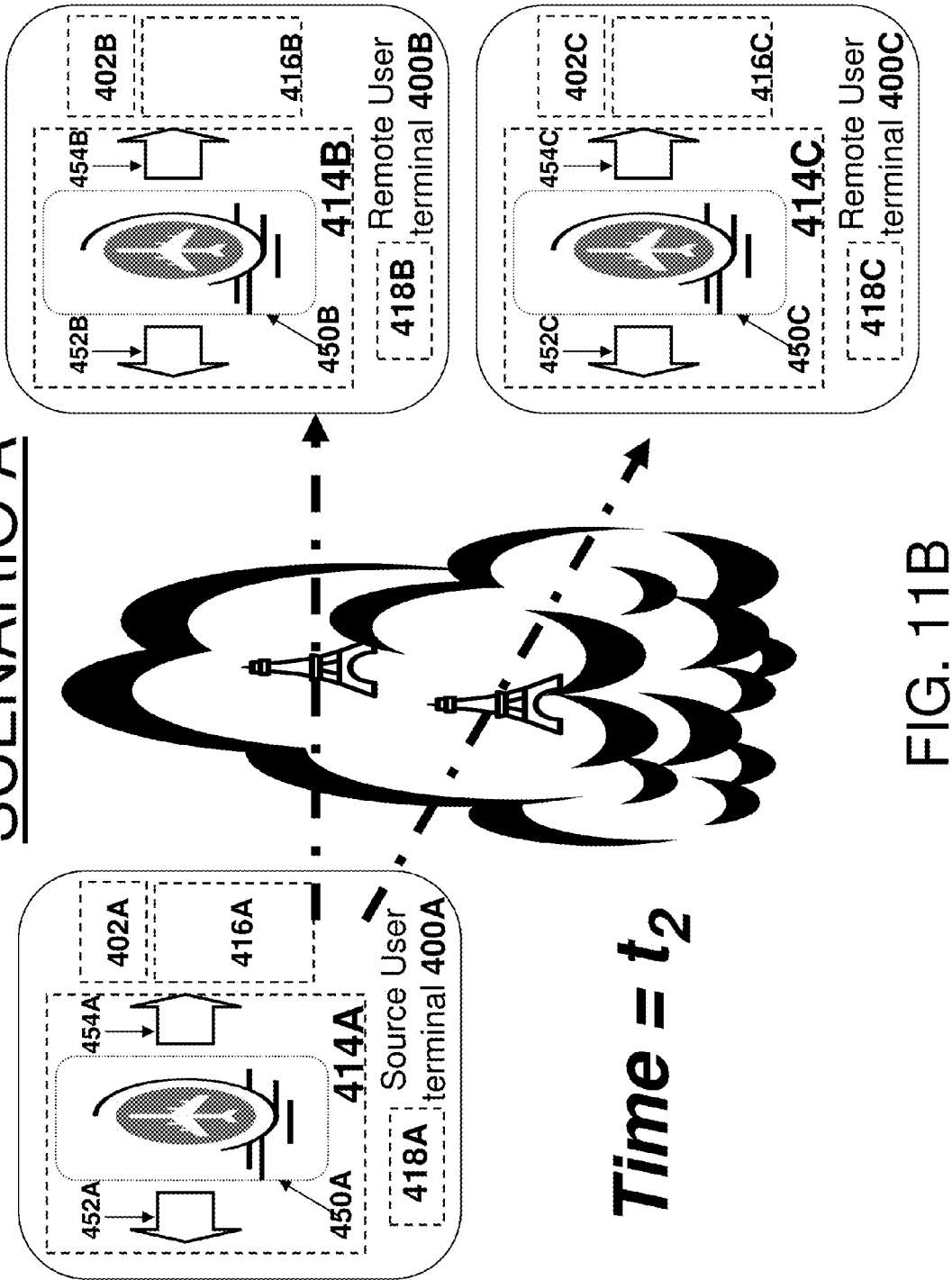
Figure 11D:
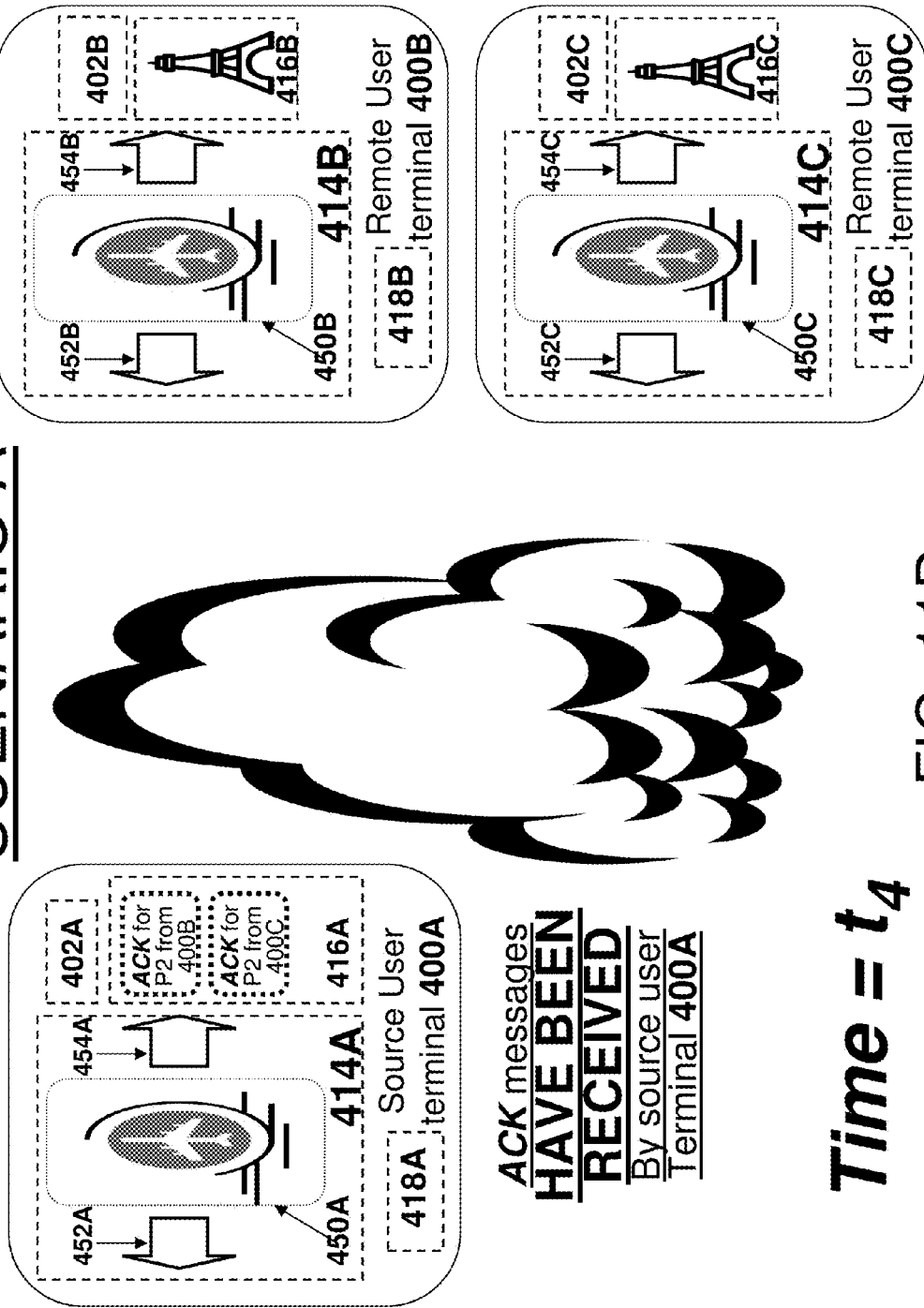
Figure 11E:

"Scenario A" of FIGS. 11A-11F occurs as follows. In FIGS. 11A-11B, when picture file P1 is displayed at the display location of source user terminal 400A, picture files P1-P2 are sent to the remote user terminals. In FIG. 11C (time t3), an acknowledgement message is sent from each of the remote user terminals 400B-400C verifying receipt of picture file P2—thus, at time t3 the acknowledgment message is en route from the remote user terminals 400B, 400C to the source user terminal 400A but has not yet arrived at the source user terminal 400A. Later. at time t4, each of the acknowledgement messages for picture file P2 is received by source terminal 400A (FIG. 11D). Subsequently, at a later time (time t5 of FIG. 11E), a slide-show display-transition at the source terminal is attempted where (i) the 'pre-transition picture-file' is P1 and (ii) the 'post-transition picture-file' is P2. Because acknowledgements have been received from the user-terminals, the attempted slide-show display-transition at the source terminal is successful, as illustrated in FIG. 11F.

Figure 12A:
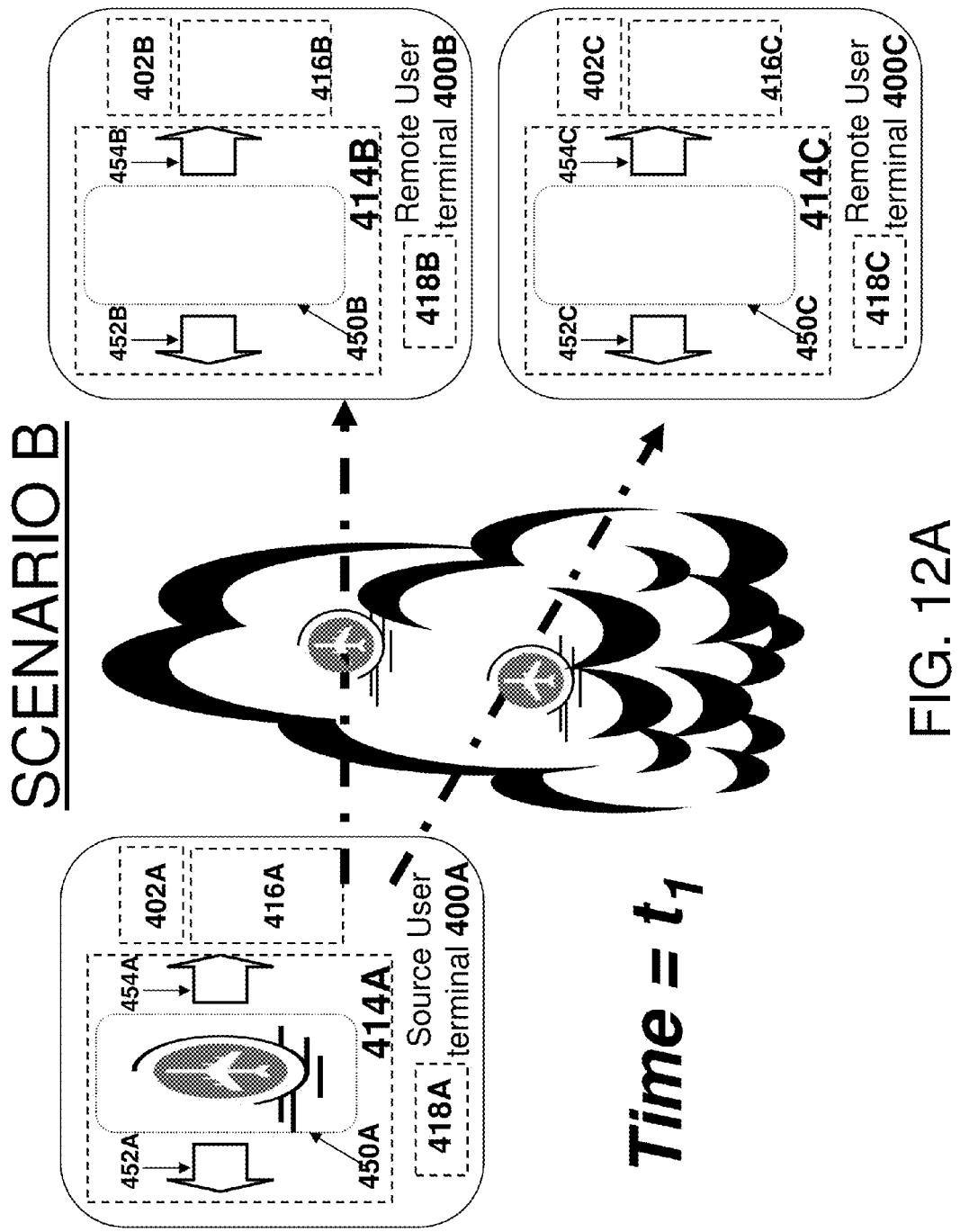
Figure 12B:
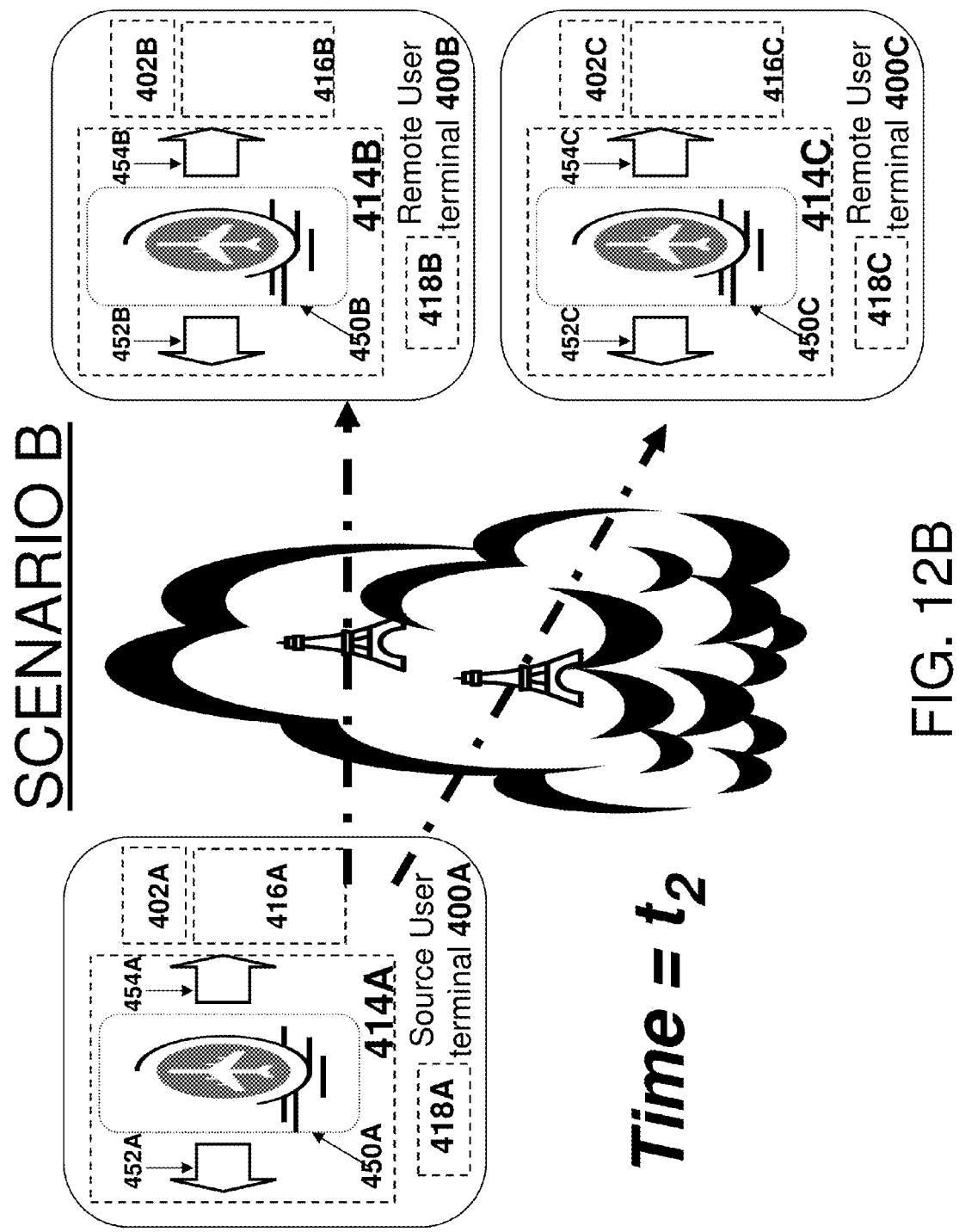
Figure 12C:
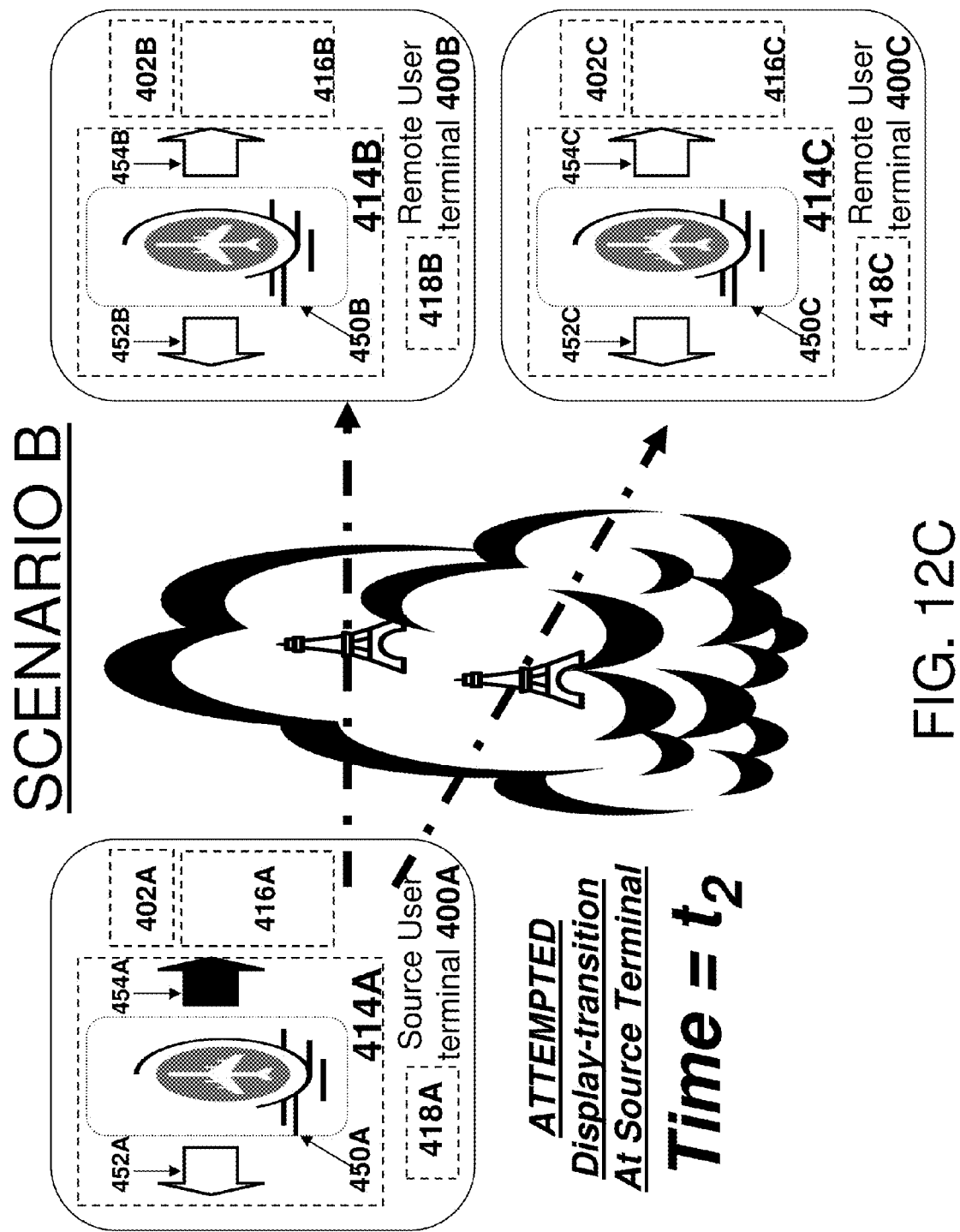
Figure 12D:
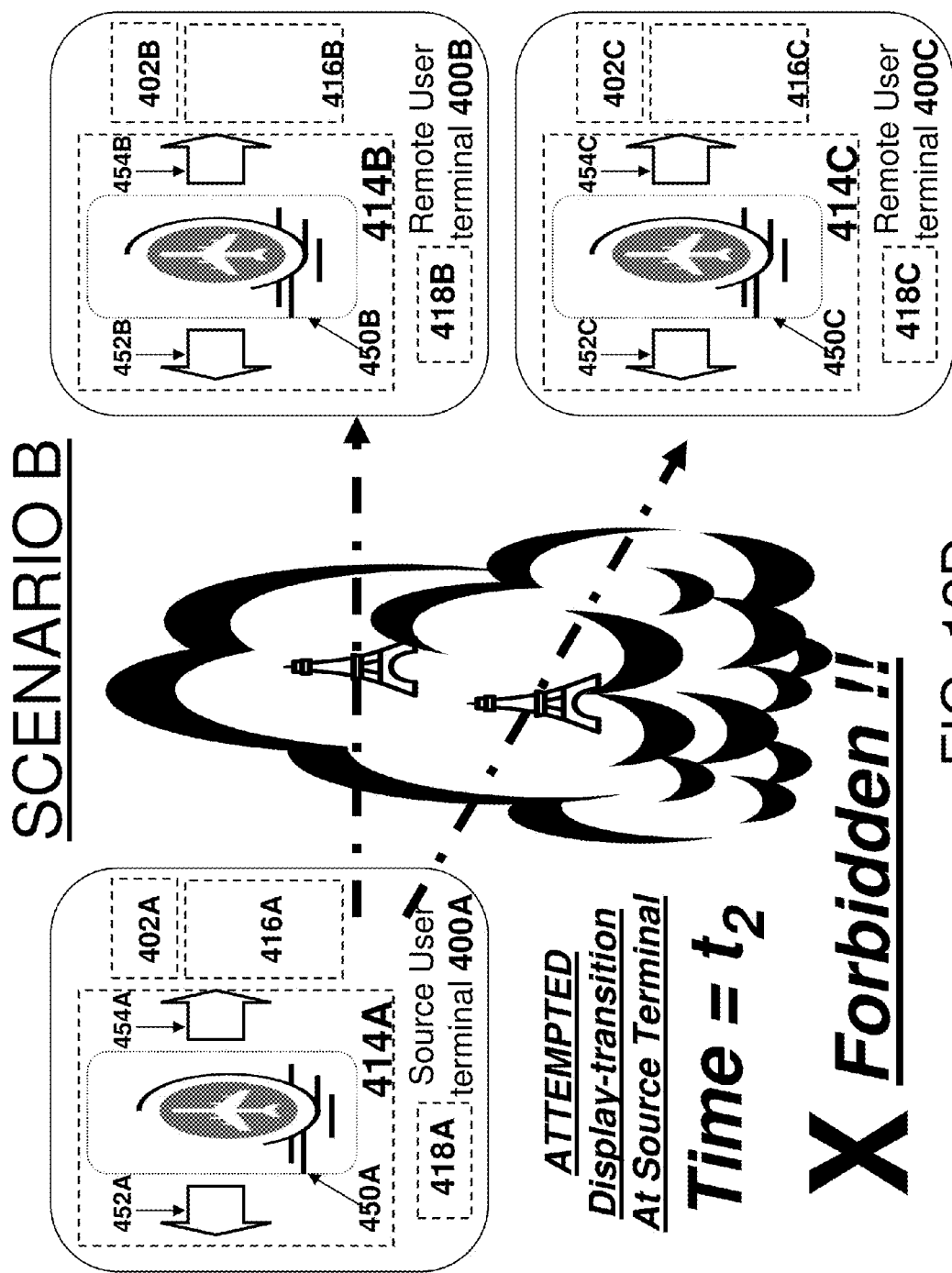

"Scenario B" of FIGS. 12A-12D occurs as follows. In FIGS. 12A-12D, when picture file P1 is displayed at the display location of source user terminal 400A, picture files P1-P2 are sent to the remote user terminals. In FIG. 12C (time t2), a 'premature' attempt is made to perform the slide-show display-transition from P1 to P2. Because no acknowledgment message has been received by time t2, this premature attempt is not successful.

Something similar occurs in the example of FIG. 13.

Figure 13A:
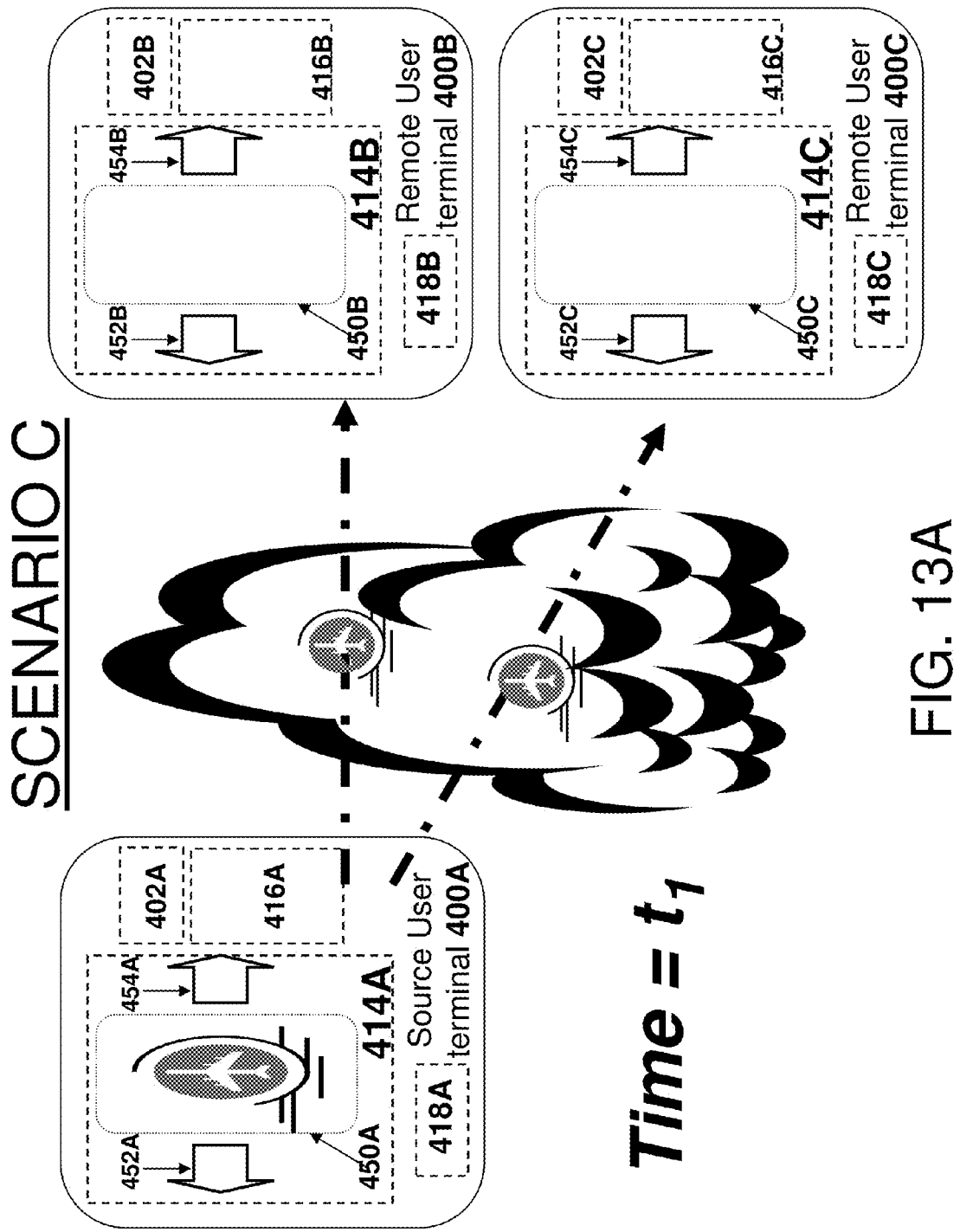
Figure 13B:
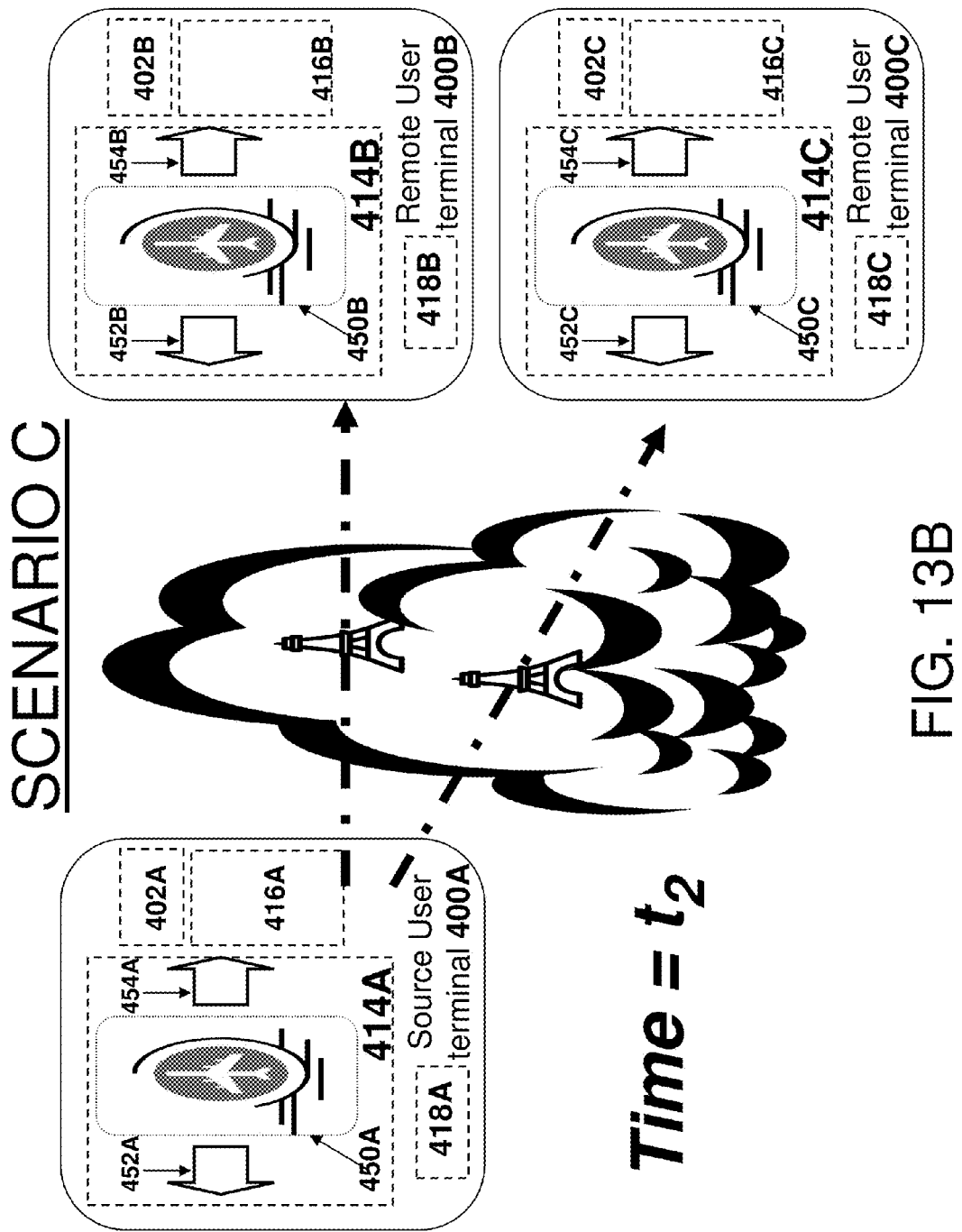
Figure 13C:
Figure 13D:
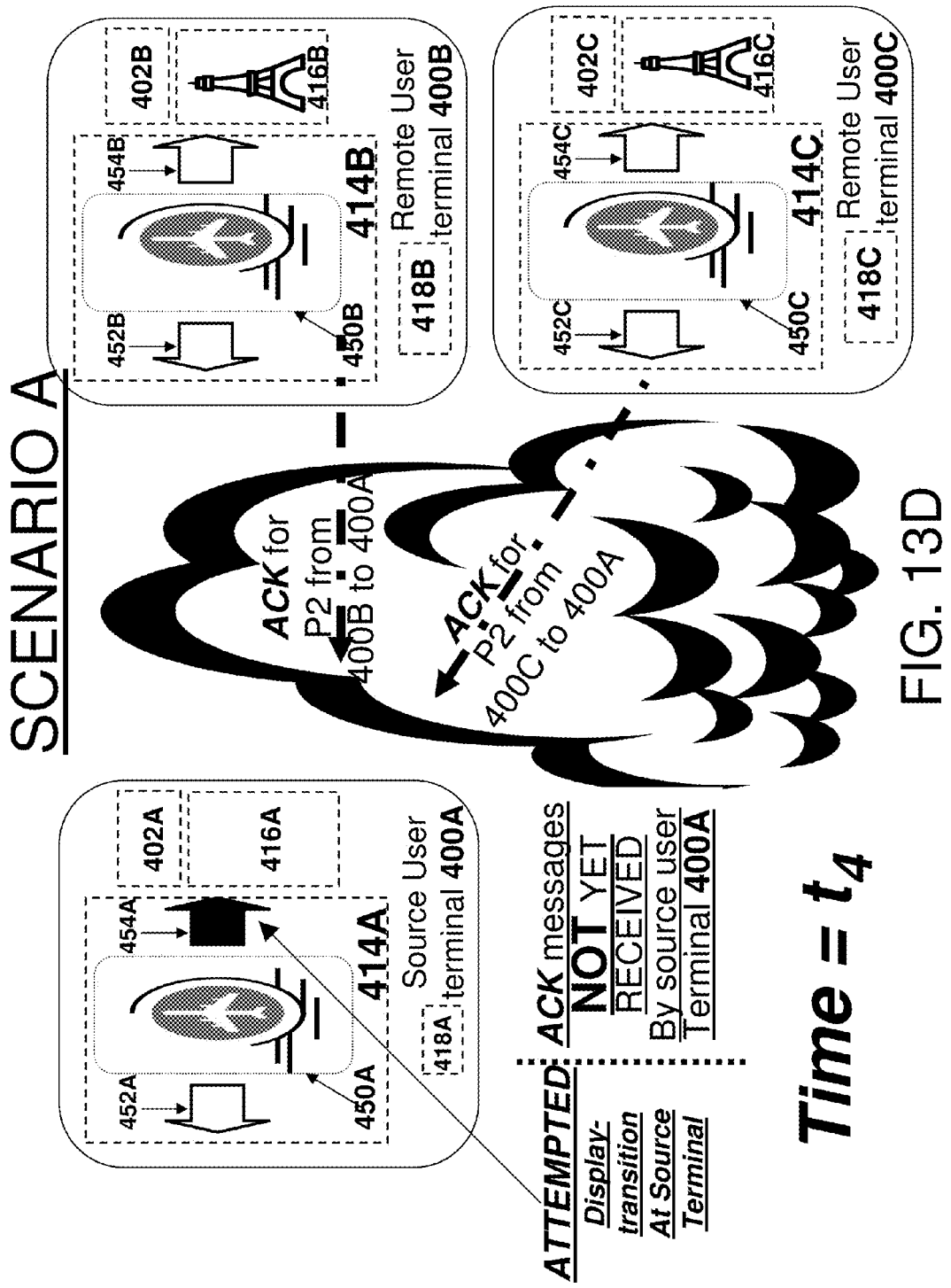

In the example of FIG. 12 the remote terminals have not even received picture P2 when the attempt to perform the slide-show display-transition from P1 to P2 is made (at time t2 of FIG. 12C) at the source terminal 400A. In contrast, in the example of FIG. 13, the remote terminals have, in fact, received picture P2 when the attempt to perform the slide-show display-transition from P1 to P2 is made (at time t4 of FIGS. 13D-13E) at the source terminal 400A. However, this attempt which occurs at time t4 of FIGS. 13D-13E is still 'premature' as the acknowledgment messages have not yet arrived at source user terminal 400A and are still en route back to terminal 400A.

Discussion of FIGS. 14-15

As noted above, FIGS. 14-15 also relate to attempts to effect a slide-show display transition at source terminal 400A. In the example of FIGS. 10-13, the slide-show display transition is prevented unless a condition related to 'remote terminal receipt' of the new picture file (and related to source terminal 400A receipt of the appropriate confirmation message) is met. In the example of FIGS. 14-15 such slide-show display transitions may be permitted even if such a condition is not met. However, after such a 'potentially-problematic' slide-show display transition (i.e. problematic because confirmations of receipt of the new picture file by one or more remote terminal(s) 'should have' been received by source terminal(s) before the slide-show display transition), a warning is provided on a user interface of source terminal 400A. This warning indicates a problematic situation related to failure of the source terminal 400A to receive the requisite confirmations from one or more remote terminal(s) in advance of the slide-show display transition which was performed despite this failure.

Figure 14A:
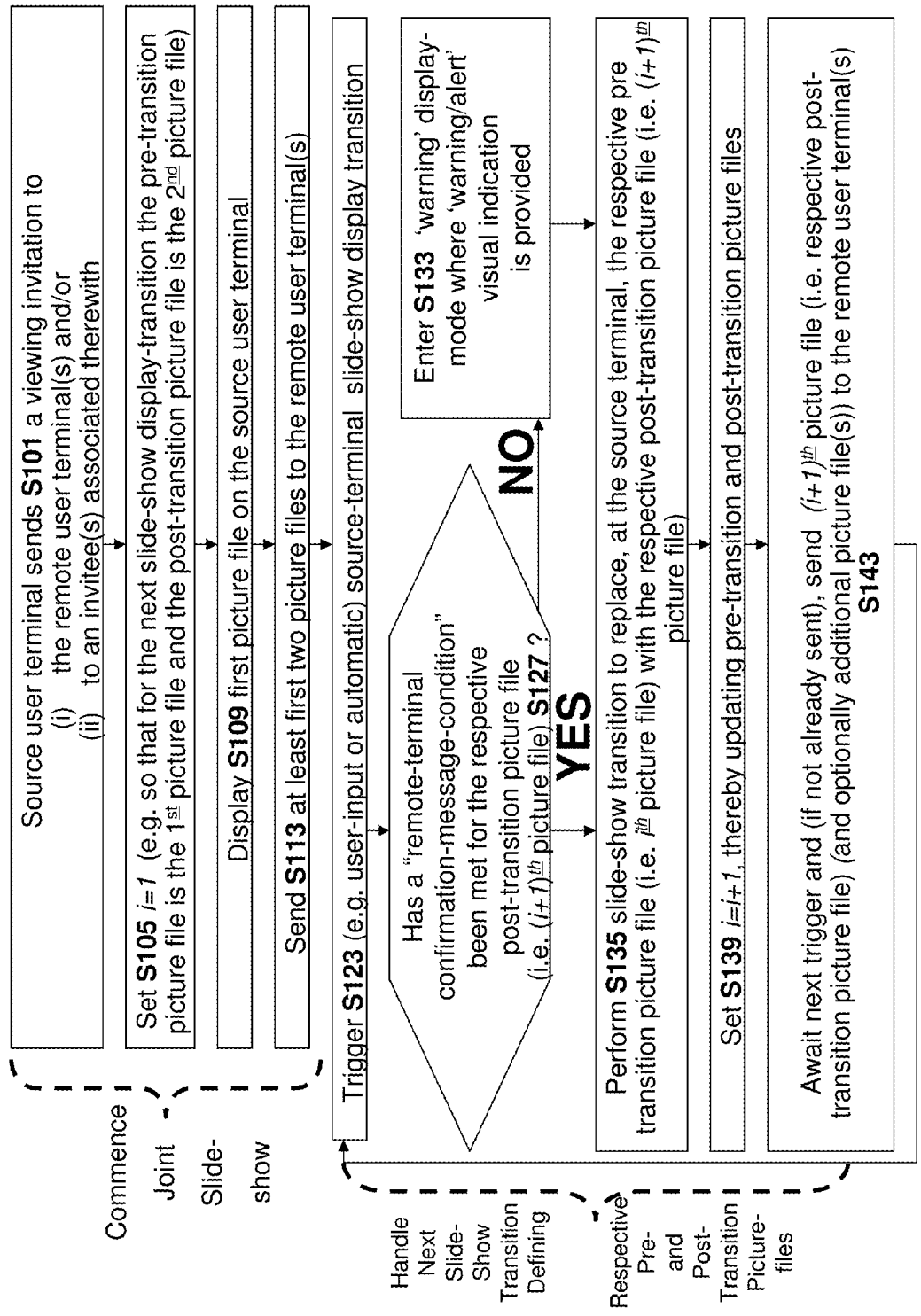

Reference is now made to FIG. 14A. Steps S101-113, S123, S127 and S135-S143 are as discussed above. However, the response to the condition of S127 is different in FIG. 14A. Instead of preventing the slide-show display transition (see step S131 of FIGS. 10A-10B), in the method of FIG. 14A the slide-show display transition is permitted even if the 'remote-terminal confirmation-message-condition' has not yet been met. However, in step S133 source terminal 400A enters a 'warning' display mode where a warning/alert visual indication of a 'problematic' situation is provided.

Figure 14B:
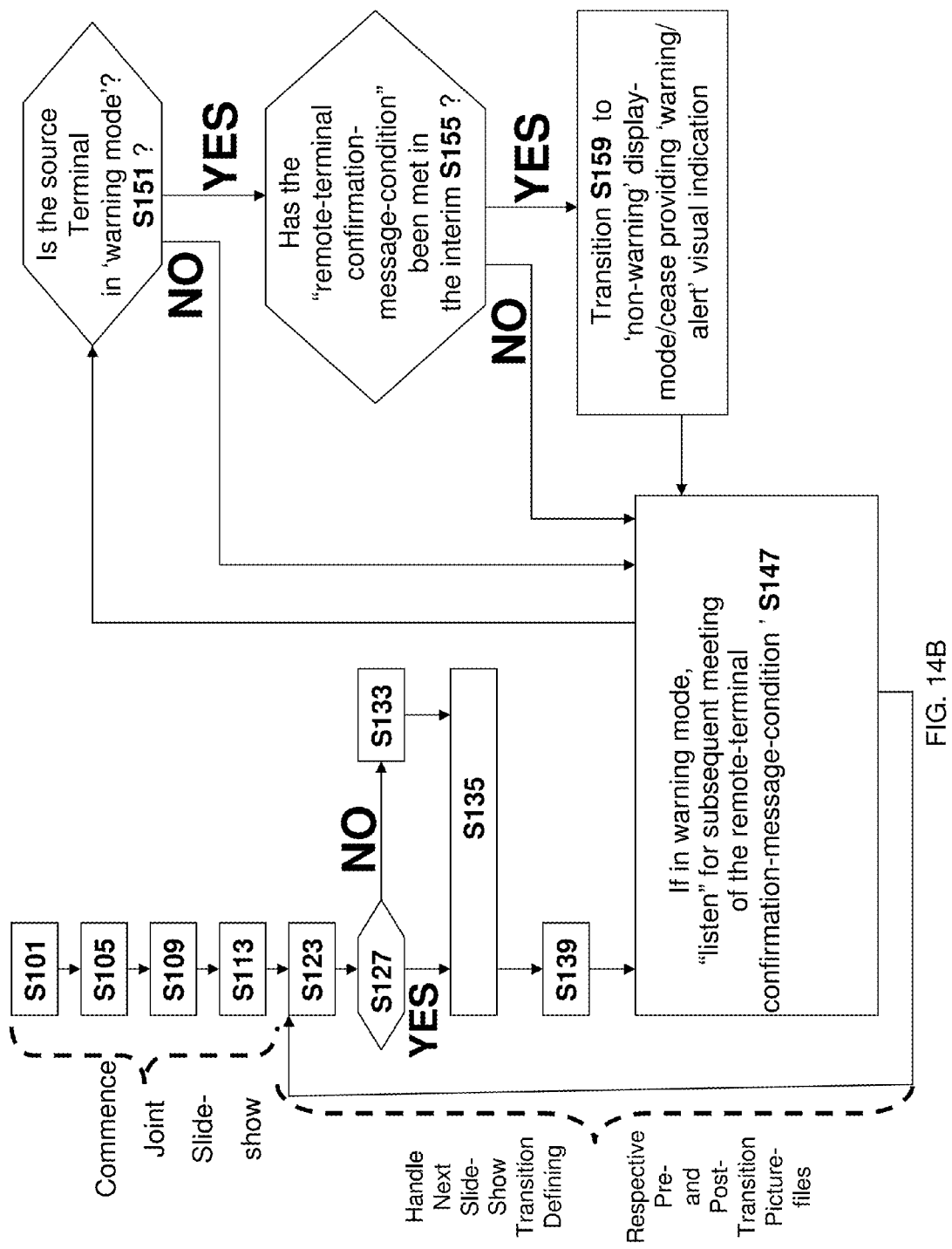

In FIG. 14B extra steps S147, S151, S155 and S159 are provided. In particular, after entering the 'warning mode' source terminal 400B monitors incoming traffic to determine if the remote-terminal confirmation-message-condition (i.e. which 'should have been met' before performing the slide-show transition of step S135) is subsequently met. Thus, in step S147 the source terminal 'listens' for subsequent meeting of the remote-terminal-confirmation-message-condition. If the source terminal is in warning mode (step S151) and the remote-terminal confirmation-message-condition has been met in the interim S155 (i.e. after the slide-show display transition), in step S159 source terminal 400A transitions to 'non-warning' mode by removing the warning/visual alert indication.

Figure 15A:
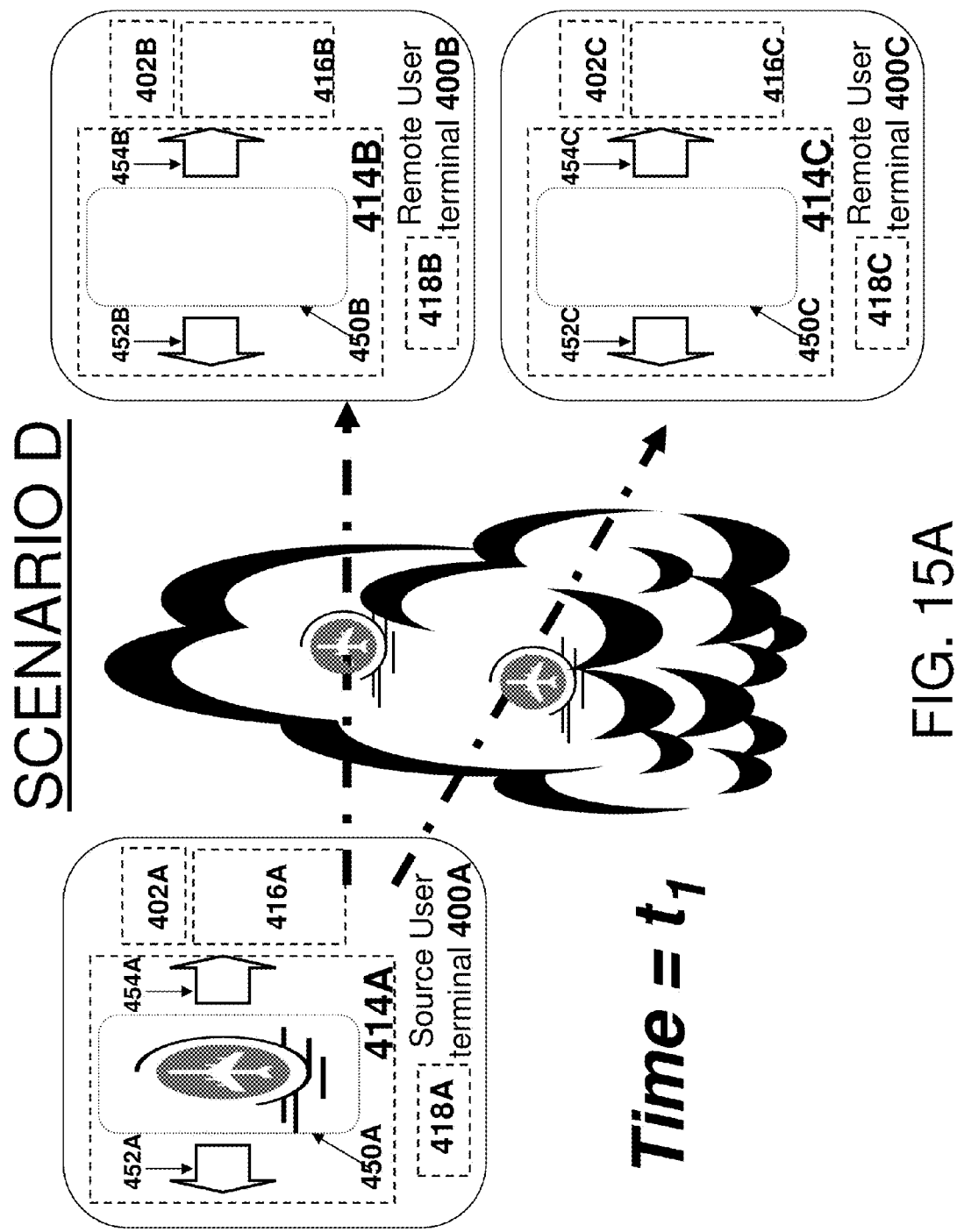
Figure 15B:
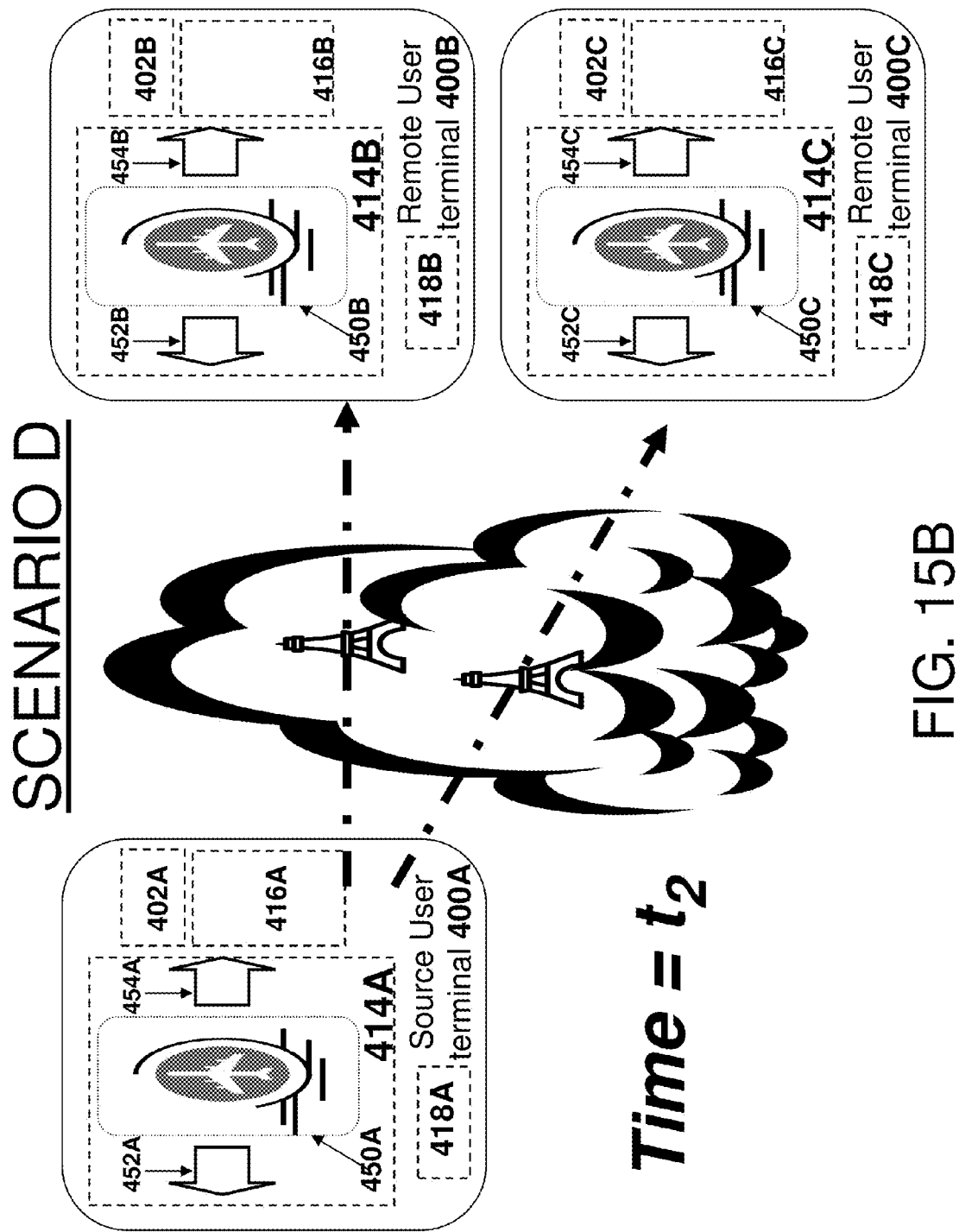
Figure 15C:
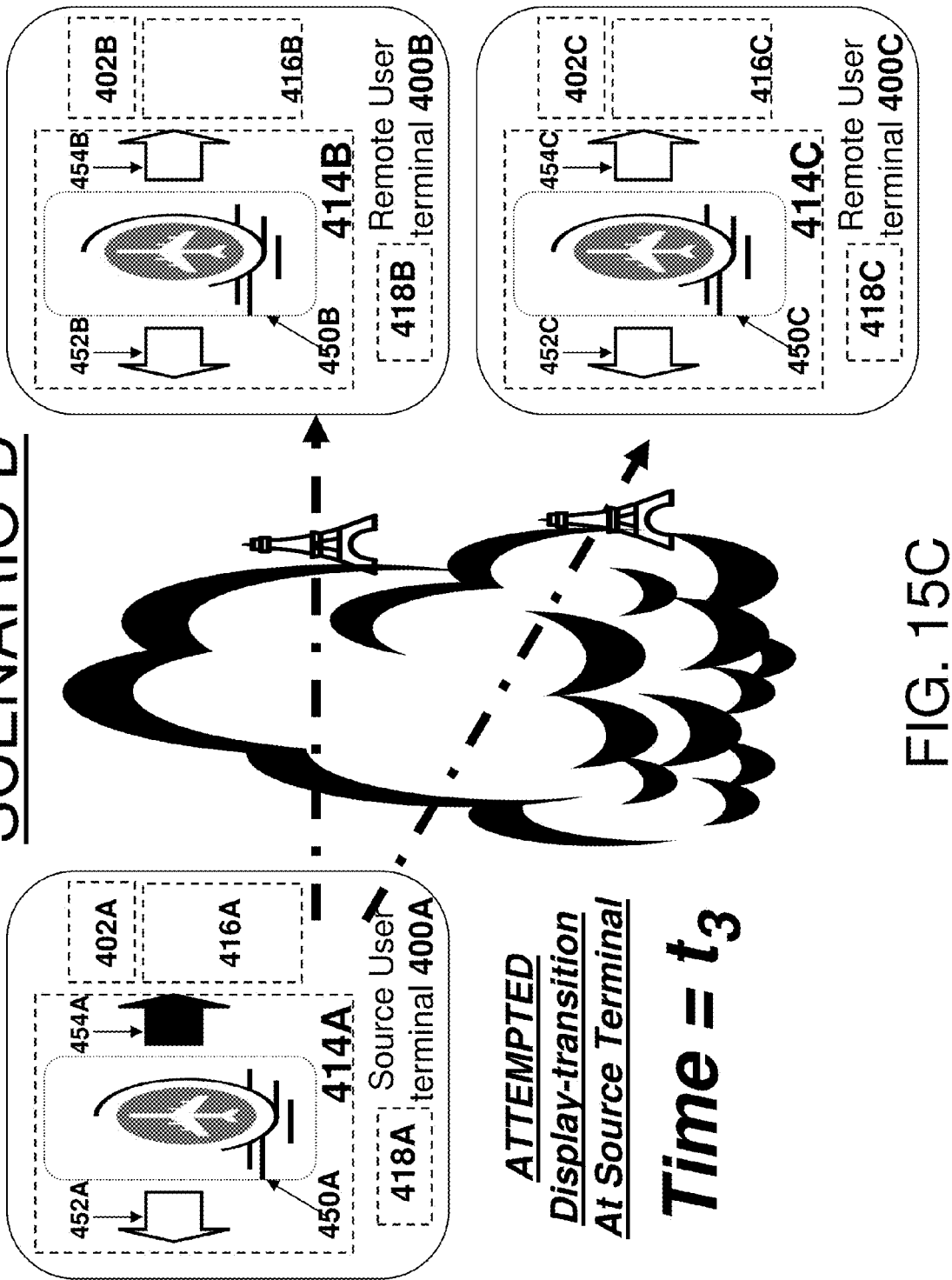

FIGS. 15A-15G describe one example of an implementation of the methods of FIGS. 14A-14B. In FIG. 15C at time t3 an 'improper' or 'premature' attempt is made to transition from picture P1 to picture P2—this is indicated by user-engagement of the 'next' GUI control 454A on source terminal 400B. At this time t3, acknowledgements of receipt of picture P2 by remote terminals 400B-400C have not yet been received at source terminal 400A at time t3. According to the method of FIGS. 10-13 the attempted slide-show display transition would not be permitted.

In contrast, in FIG. 15C, the slide-show display transition is permitted at time t3—however, a 'warning' is provided to the user(s) of source terminal 400A by displaying picture P2 (the 'Eiffel tower') in a crooked manner—this is one example of the 'warning mode' of step S133. The 'warning' display-mode is visible as a crooked Eiffel tower in slide 15D. As an example of the method of FIG. 14B, this warning mode prevails until time t5, when acknowledgement is received at source terminal 400A.

At time t3 of FIG. 15C, picture P2 is en route to the remote terminals. At time t4 of FIG. 15D, the receipt-acknowledgement message of picture P2 is en route from remote terminal 400B-400C back to the source terminal 400A but has not yet reached the source terminal 400A. At time t5, the receipt-acknowledgement message of picture P2 reaches source terminal 400A.

Figure 15D:
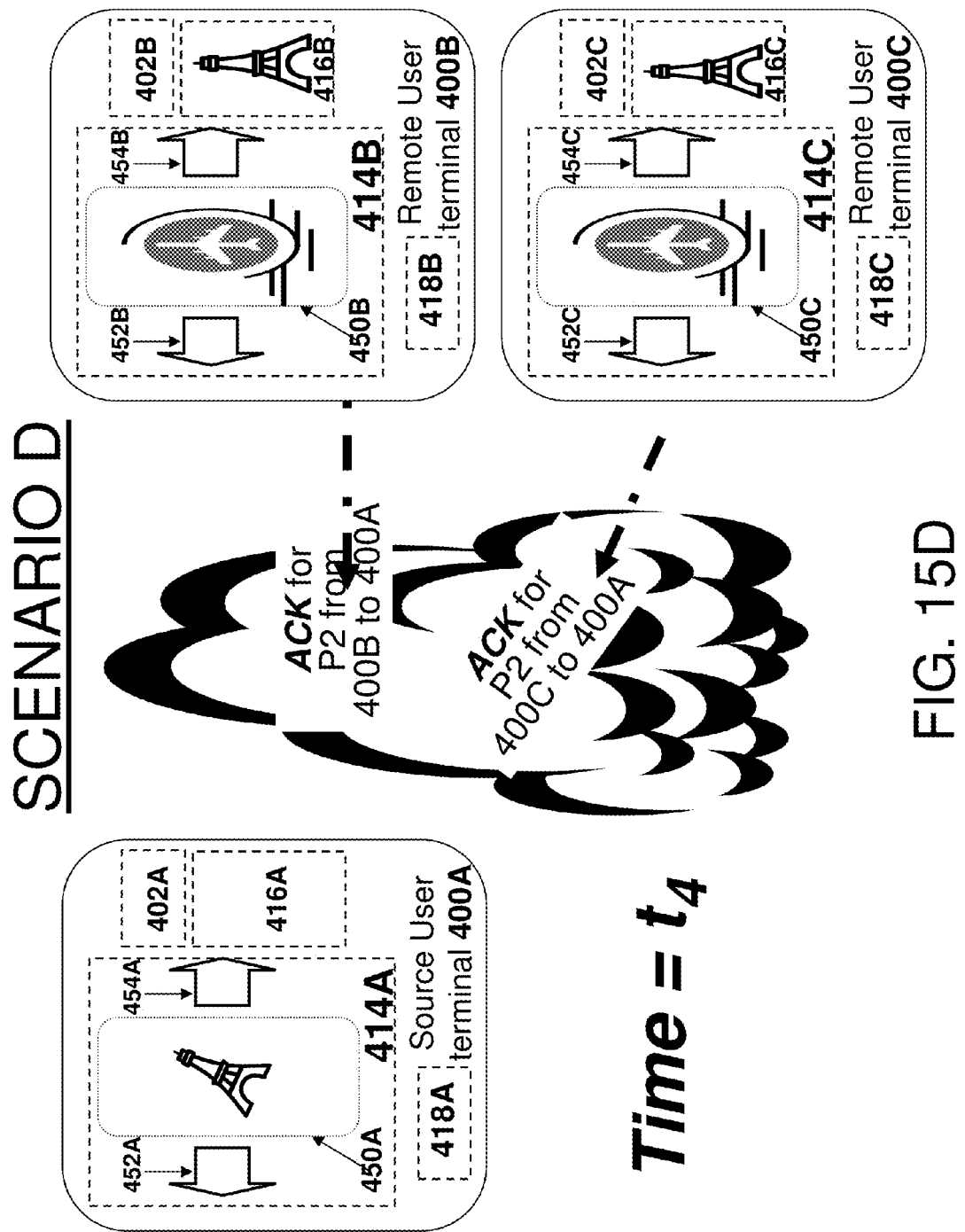

As illustrated in FIG. 15E, source terminal 400A responds to receipt of the requisite acknowledgement messages from remote terminal(s) 400B-400C by exiting the warning mode (steps S155-S159)—in this case, by modifying the manner in which the post-transition picture file is displayed (i.e. from 'diagonal' or 'crooked' display of FIG. 15D to 'vertical' display of FIG. 15E).

A Discussion of FIGS. 16-17

FIGS. 16-17 relates to another embodiment where 'commands to display' the picture file at remote terminal(s) 400B-400C are sent to the remote terminal(s) 400B-400C separately from the actual picture files. FIG. 16 is the method performed by source terminal 400A and FIG. 17 is the method performed by the remote terminal(s) 400B.

It is noted that just as the source terminal performs slide-show display transitions, each remote terminal 400B, 400C, etc (e.g. according to application software 404) respective performs slide-show display transitions. Contrary to prior art systems, in which it is sufficient for source terminal 400A to send the picture file—in response to receipt of the picture file, the remote terminals 400B, 400C perform the slide-show display transition, here receipt of a picture file by the remote terminals 400B, 400C is necessary but not sufficient to cause the remote terminals 400B, 400C to perform the display-transition. For example, receipt of a separate command to perform the slide-show-transition (i.e. sent by source terminal 400A separately from the picture-file) may additionally be required by remote terminals 400B, 400C in order to perform the slide-show display transition. FIGS. 16-17 relate to one particular case where remote terminals 400B, 400C require this 'command' to perform the slide-show transitions.

Steps S101, S105, S109, S123, S135, and S139 are similar to their counterparts in FIG. 6.

Although step S211 is illustrated in the flow-chart as being performed after steps S101-S109 this is not a limitation, and any portion (or any entirety) of step S211 may be performed before or simultaneous with any of steps S101-S109.

In step S211, source terminal 400A sends the first picture (i.e. the $i^{th}$ picture where i=1) to the remote terminal(s). Subsequently, source terminal 400A performs step S171 whereby source terminal 400A sends a 'slide-show transition' command to the remote terminal(s) instructing the terminal(s) 400B to perform slide-show transition from the ith picture file to the (i+1)th picture file (i.e. to the respective post-transition picture file).

For the (i+1)th picture file step S175 is performed subsequent to (or simultaneously with) step S171. In step S175, source terminal 400A separately sends (i.e. separate from the 'command to transition') the (i+1)th picture file (i.e. respective post-transition picture file) to the remote user terminal(s) 400B, 400C.

In step S181, the source terminal awaits the next trigger.

FIG. 17 is performed by the remote terminal(s) 400B-400C. In step S201, a value of i is step to 1. In step S205 the first picture file (i.e. sent in step S211 of FIG. 16) is received—for example, remote terminal(s) 400B-400C receive this first picture file before receiving the first 'command to transition' (i.e. sent by source terminal 400A the first time source terminal 400A performs step S171 of FIG. 16).

In step S261 the remote terminal monitors incoming data to receive (i) additional picture file(s) in step S209 and (ii) commands to 'display' the additional picture files—ie. to perform at remote terminal(s) 400B slide-show display transitions. For the i+1 picture file, in the event that the picture file has been received (step S217), this is necessary but not sufficient for performing the display-transition to the i+1 picture file on the remote terminal. Thus, in steps S221-S225, this display-transition is only performed at the remote terminal 400B-400C if the requisite 'command to display is also received. As noted above, this 'command to display' is sent from source terminal 400A in step S171 of FIG. 16. This 'command to display' is sent from source terminal 400A separately from the picture-file which is sent in step S175 of FIG. 16.

Additional Discussion

A method of viewing a group of multiple picture files, wherein the viewing is jointly done in a first computer and in at least one other computer comprises: identifying a group of multiple picture files residing in a first computer; inviting at least one invitee to jointly view said multiple picture files, wherein said inviting is done from said first computer and wherein said inviting comprises for each one of said at least one invitee sending an invitation message to a corresponding computer associated with said one invitee; displaying a first picture file of said multiple picture files in said first computer; transferring said first picture file to each one of said corresponding computers associated with said at least one invitee; displaying said first picture file in each one of said corresponding computers associated with said at least one invitee; determining a transition time to switch from displaying said first picture file to displaying a second picture file of said multiple picture files; displaying said second picture file in said first computer, wherein said displaying of said second picture file is done at said transition time; transferring said second picture file to each one of said corresponding computers associated with said at least one invitee; sending a command to each one of said corresponding computers associated with said at least one invitee to display said second picture file; and displaying said second picture file in each one of said corresponding computers associated with said at least one invitee wherein, for at least one invitee of said at least one invitee, said sending a command to said one invitee to display said second picture file occurs before said transferring of said second picture file to said one invitee is completed.

In some embodiments, said transferring of said second picture file begins before said displaying of said second picture file in said first computer begins.

In some embodiments, said multiple picture files are all the picture files residing in a folder.

In some embodiments, said identifying said group of multiple picture files comprises selecting said folder by a user of said first computer.

In some embodiments, said folder contains additional files that are not picture files and said additional files are excluded from said group.

In some embodiments, the method further comprises: adding a third picture file to said folder while said first computer is displaying said first picture file, wherein in response to said adding, said third picture file is automatically added to said group of multiple picture files.

In some embodiments, the method further comprises: removing a third picture file from said folder while said first computer is displaying said first picture file, wherein in response to said removing, said third picture file is automatically removed from said group of multiple picture files.

In some embodiments, said multiple picture files are all the picture files residing in a folder which satisfy a condition.

In some embodiments, said condition is related to a creation date of a picture file to which it is applied.

In some embodiments, said condition is related to a resolution of a picture file to which it is applied.

In some embodiments, said condition is related to a size of a picture file to which it is applied.

In some embodiments, said condition is related to a prefix of a name of a picture file to which it is applied.

In some embodiments, said condition is related to a suffix of a name of a picture file to which it is applied.

In some embodiments, said condition is related to a file extension of a picture file to which it is applied.

In some embodiments, said determining said transition time is based on a time interval for displaying each picture file of said multiple picture files.

In some embodiments the method further comprises: enabling, by a user of said first computer, an invitee of said at least one invitee to set said transition time.

In some embodiments the method further comprises: enabling, by a user of said first computer, an invitee of said at least one invitee to keep a copy of a picture file of said multiple picture files.

In some embodiments the method further comprises: attaching, by an invitee of said at least one invitee, a text comment to a picture file of said multiple picture files.

In some embodiments the method further comprises: attaching, by an invitee of said at least one invitee, an audio comment to a picture file of said multiple picture files.

In some embodiments the method further comprises: accepting said invitation message in each one of said corresponding computers, wherein said accepting is done automatically without requiring a human intervention.

In some embodiments, said inviting is initiated at said first computer by a user, wherein the method further comprises: subsequent to said inviting viewing at least one of said multiple picture files in one of said corresponding computers by said user.

In some embodiments, said user sets said transition time from said one of said corresponding computers.

In some embodiments the method further comprises: repeating said displaying of said first picture file and said second picture file in said first computer in an infinite loop.

In some embodiments, said multiple picture files are displayed according to an ordering of said picture files and after a last picture file according to said ordering is displayed the next picture file to display is a first picture file according to said ordering.

In some embodiments, said multiple picture files are displayed according to a random order.

A method of viewing a group of multiple picture files, wherein the viewing is jointly done in a first computer and in at least one other computer comprises: identifying a group of multiple picture files residing in a first computer; inviting at least one invitee to jointly view said multiple picture files, wherein said inviting is done from said first computer and wherein said inviting comprises for each one of said at least one invitee sending an invitation message to a corresponding computer associated with said one invitee; transferring a first picture file of said multiple picture files to each one of said corresponding computers associated with said at least one invitee; displaying said first picture file on each one of said corresponding computers associated with said at least one invitee; for each one of said corresponding computers associated with said at least one invitee, sending a confirmation message to said first computer after said transferring of said first picture file to said one computer completes; and f) displaying said first picture file in said first computer, wherein said displaying said first picture file in said first computer is done after a condition related to said confirmation messages is satisfied.

In some embodiments, said condition is that at least one of said corresponding computers sent said confirmation message.

In some embodiments, said condition is that each one of said corresponding computers sent said confirmation message.

In some embodiments the method further comprises: displaying in said first computer an indication indicating a confirmation status of said transferring of said first picture file.

In some embodiments, said indication indicates a condition of no confirmation messages received for said first picture file.

In some embodiments, said indication indicates a number of said corresponding computers from which said confirmation messages for said first picture file were received.

In some embodiments, said indication identifies a name of one invitee of said at least one invitee, wherein said corresponding computer associated with said one invitee sent said confirmation message.

In some embodiments, said indication identifies names of multiple invitees of said at least one invitee, wherein each one of said corresponding computers associated with said multiple invitees sent said confirmation message.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of managing a joint slide-show by a source user terminal in communication with one or more remote user terminal(s), the slide-show for showing a plurality of picture files residing on the source user terminal, the method comprising:
 a. commencing the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and
 b. subsequently, locally performing one or more slide-show display-transitions at the source user terminal by replacing, at a slide-show display-location of the source user terminal, a pre-transition picture file with a post-transition picture file, wherein:
  i. for each slide-show display-transition, a respective post-transition picture file is sent from the source user terminal to each remote user terminal in advance of the slide-show display-transition; and
  ii. each of the slide-show display-transitions is contingent upon, and performed only after meeting a condition related to a number of remote user-terminals from which the source user terminal has received a confirmation message confirming receipt of the respective post-transition picture file.

2. The method of claim 1 wherein the source user terminal is in communication with a plurality of remote user-terminals, and the condition requires receipt of confirmation messages from a majority of the remote user terminals.

3. The method of claim 1 wherein the source user terminal is in communication with a plurality of remote user-terminals, and the condition requires receipt of confirmation messages from every remote user terminal.

4. The method of claim 1 wherein the source user terminal is in communication with a plurality of remote user-terminals, and the condition requires receipt of confirmation messages from at least one of the remote user terminals.

5. The method of claim 1 wherein the source user terminal is in communication with only a single remote user terminal, and the condition requires receipt of a confirmation message from the single remote user-terminal.

6. A method of managing a joint slide-show by a source user terminal in communication with one or more remote user terminal(s), the slide-show for showing a plurality of picture files residing on the source user terminal, the method comprising:
 a. commencing the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and
 b. subsequently, locally performing one or more slide-show display-transitions at the source user terminal by replacing, at a slide-show display-location of the source user terminal, a pre-transition picture file with a post-transition picture file, wherein:
  i. for each slide-show display-transition, a respective post-transition picture file is sent from the source user terminal to each remote user terminal in advance of the slide-show display-transition; and
  ii. following each source-terminal slide-show display transition and in response thereto, a post-transition visual indication is provided by the source user terminal, indicating whether or not a condition has been met, the condition being related to a number of remote user-terminals from which the source user terminal has received a confirmation message confirming receipt of the respective post-transition picture file.

7. The method of claim 6 wherein the source user terminal is in communication with a plurality of remote user-terminals, and the condition requires receipt of confirmation messages from a majority of the remote user terminals.

8. The method of claim 6 wherein the source user terminal is in communication with a plurality of remote user-terminals, and the condition requires receipt of confirmation messages from every remote user terminal.

9. The method of claim 6 wherein the source user terminal is in communication with a plurality of remote user-terminals, and the condition requires receipt of confirmation messages from at least one of the remote user terminals.

10. The method of claim 6 wherein the source user terminal is in communication with only a single remote user terminal, and the condition requires receipt of a confirmation message from the single remote user-terminal.

11. The method of claim 6, wherein the post-transition visual indication is provided by a display mode of the post-transition picture file of the display transition.

12. The method of claim 6, wherein the post-transition visual indication is provided by a display mode of at least one slide-show user interface control.

13. The method of claim 1 wherein: in advance of each source-terminal slide-show display transition, a pre-transition visual indication is provided by the source user terminal, indicating whether the condition related to the number of remote user-terminals from which the source user terminal has received a confirmation message confirming receipt of the respective post-transition picture file has respectively been met.

14. The method of claim 13, wherein the pre-transition visual indication is provided by a display mode of the pre-transition picture file of the display transition.

15. A method of managing a joint slide-show by a source user terminal in communication with one or more remote user terminal(s), the slide-show for showing a plurality of picture files residing on the source user terminal, the method comprising:
   a. commencing the slide-show by (i) for each given remote user terminal of the one or more remote user terminal(s), sending from the source user terminal a viewing invitation to the given remote user terminal and/or to an invitee associated with the given remote user terminal; (ii) displaying a first of the picture files on the source user terminal; and (iii) sending the first picture file to each remote user terminal; and
   b. subsequently, locally performing one or more slide-show display-transitions at the source user terminal by replacing, at a slide-show display-location of the source user terminal, a pre-transition picture file with a post-transition picture file, wherein:
      i. for each slide-show display-transition, a respective post-transition picture file is sent from the source user terminal to each remote user terminal in advance of the slide-show display-transition; and
      ii. for each slide-show display-transition defining respective pre-transition and post-transition picture files, a respective command-to-transition is sent to each remote user terminal instructing each remote user terminal to respectively perform a slide-show display transition to replace the respective pre-transition picture file with the respective post-transition picture file such that the respective command-to-transition is sent from the source user terminal concurrent with or before the sending of the respective post-transition picture file.

16. The method of claim 1 wherein, for each remote user terminal, the sending of each picture file from the source user terminal to the remote user terminal is contingent upon receiving, by the source user terminal from the remote user terminal, a confirmation that the remote user terminal has received one of the viewing invitation(s) and/or session-login credentials descriptive of one or more of the viewing invitation(s).

17. The method of claim 1 wherein the picture files all reside within a common folder on the source user terminal.

18. The method of claim 1 further comprising accepting the viewing invitation(s) by the remote user-terminal(s), the accepting being performed automatically without requiring human intervention.

19. The method of claim 1 wherein the sending of the viewing invitation(s) by the source user terminal is triggered by an input from a user, and the method further comprises: subsequent to the invitation-sending, presenting the first picture file to the user by one of the remote user terminal(s).

20. The method of claim 1 wherein, for each slide-show display transition associated with a respective post-transition-picture file, the source user terminal displays an indication of a number of remote user terminals from which the source user terminal has received a confirmation message confirming receipt of the respective post-transition picture file.

* * * * *